US009411128B2

United States Patent
Isobe

(10) Patent No.: US 9,411,128 B2
(45) Date of Patent: Aug. 9, 2016

(54) AUTOMATIC FOCUSING APPARATUS WITH CYCLIC PATTERN DETERMINATION

(71) Applicant: CANON KABUSHIKI KAISHA, Tokyo (JP)

(72) Inventor: Shingo Isobe, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1 day.

(21) Appl. No.: 14/452,691

(22) Filed: Aug. 6, 2014

(65) Prior Publication Data
US 2014/0340564 A1 Nov. 20, 2014

Related U.S. Application Data

(62) Division of application No. 13/510,978, filed as application No. PCT/JP2011/051152 on Jan. 18, 2011, now Pat. No. 8,860,872.

(30) Foreign Application Priority Data

Jan. 22, 2010 (JP) ................................. 2010-012093

(51) Int. Cl.
*G02B 7/28* (2006.01)
*G02B 7/34* (2006.01)
(Continued)

(52) U.S. Cl.
CPC ................ *G02B 7/282* (2013.01); *G02B 7/343* (2013.01); *G03B 13/36* (2013.01); *H04N 5/23212* (2013.01)

(58) Field of Classification Search
CPC . G02B 7/282; G02B 7/343; G02B 7/34–7/38; G03B 13/36; H04N 5/23212; H04N 5/3696
USPC .......................... 348/207.99, 222.1, 345–357; 396/63–70, 80, 104, 133, 213–262; 250/201.4, 201.6, 201.7; 352/139, 140; 359/696, 698; 382/255
See application file for complete search history.

(56) References Cited

U.S. PATENT DOCUMENTS 4,591,919 A * 5/1986 Kaneda et al. ................. 348/348
5,597,999 A * 1/1997 Kinba et al. ................ 250/201.7
(Continued)

FOREIGN PATENT DOCUMENTS

| CN | 101241222 A | 8/2008 |
| JP | 63-262611 A | 10/1988 |

(Continued)

OTHER PUBLICATIONS

Search Report dated Apr. 11, 2014, in European Application No. 11734787.2.

(Continued)

*Primary Examiner* — Dennis Hogue
(74) *Attorney, Agent, or Firm* — Fitzpatrick, Cella, Harper & Scinto

(57) ABSTRACT

An automatic focusing apparatus includes a position detecting unit for a focus unit, a driving unit for the focus unit, a focus detecting unit using a phase difference method, a contrast acquiring unit for picking up an image of object, and a focusing determining unit based on a contrast, a cyclic pattern determining unit for an object based on focus information obtained by the focusing detecting unit, a target position setting unit for driving of the focus unit, and a focusing direction determining unit, and, when the object has a cyclic pattern, the apparatus determines a direction of an in-focus point, sets a target position in the determined direction of the in-focus point, drives the focus unit toward the target position, and determines whether or not in-focus state is achieved by using the focusing determining unit.

9 Claims, 22 Drawing Sheets

(51) Int. Cl.
  *G03B 13/36* (2006.01)
  *H04N 5/232* (2006.01)

(56) References Cited

U.S. PATENT DOCUMENTS

| | | | |
|---|---|---|---|
| 6,124,890 A * | 9/2000 | Muramoto | 348/345 |
| 6,760,547 B2 | 7/2004 | Yoshida | |
| 7,643,082 B2 | 1/2010 | Onozawa | |
| 7,657,169 B2 | 2/2010 | Nakahara | |
| 7,869,704 B2 | 1/2011 | Uenishi | |
| 8,208,803 B2 | 6/2012 | Uenishi | |
| 2004/0105673 A1 | 6/2004 | Yoshida | |
| 2008/0007644 A1* | 1/2008 | Matsumoto | 348/345 |
| 2009/0028539 A1* | 1/2009 | Nakahara | 396/104 |
| 2009/0175611 A1* | 7/2009 | Kiyamura et al. | 396/133 |
| 2010/0302433 A1* | 12/2010 | Egawa | 348/345 |

FOREIGN PATENT DOCUMENTS

| | | | | |
|---|---|---|---|---|
| JP | 63262611 A * | 10/1988 | | G02B 7/11 |
| JP | 10-213843 A | 8/1998 | | |
| JP | 2004-117295 A | 4/2004 | | |
| JP | 2006-227133 A | 8/2006 | | |
| JP | 2006-237994 A | 9/2006 | | |
| JP | 2006-301150 A | 11/2006 | | |
| JP | 2007-264299 A | 10/2007 | | |
| JP | 2007-322978 A | 12/2007 | | |
| JP | 2008-185613 A | 8/2008 | | |
| JP | 2009-063921 A | 3/2009 | | |

OTHER PUBLICATIONS

English translation of JP2007-264299 ("XP055111567"), Oct. 11, 2007.

English translation of JP 10-213843 ("XP05111754" and "XP055111755" (parts 1 and 2)), Aug. 11, 1998.

Office Action dated Aug. 13, 2014, in Chinese Patent Application No. 201180006251.5.

Office Action dated Aug. 4, 2015, in Japanese Patent Application No. 2014-177236.

* cited by examiner

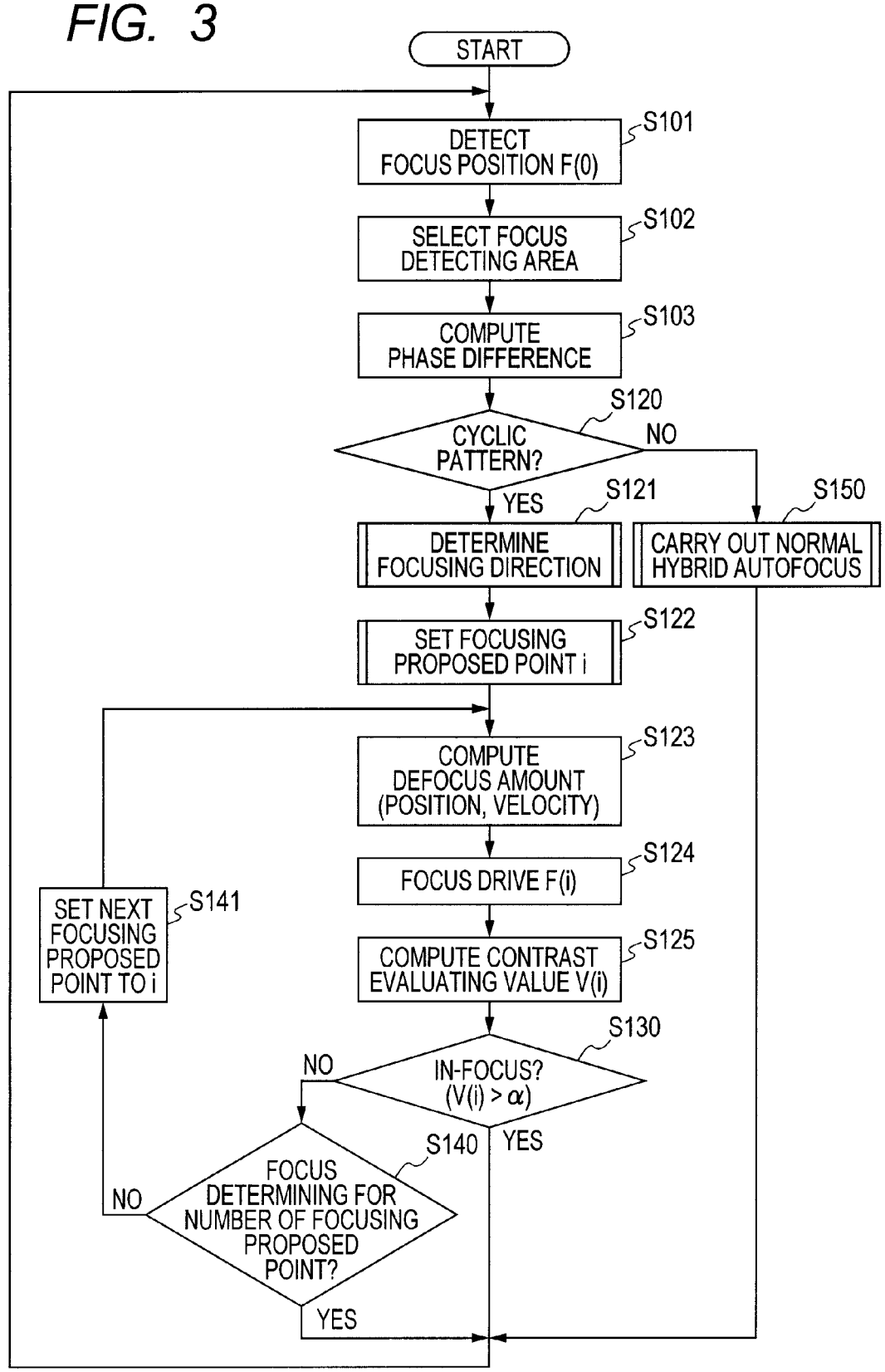

AUTOMATIC FOCUSING APPARATUS WITH CYCLIC PATTERN DETERMINATION

This application is a division of application Ser. No. 13/510,978, filed on May 21, 2012, which is a national stage entry of International Application No. PCT/JP2011/051152, filed Jan. 18, 2011.

TECHNICAL FIELD

The present invention relates to an automatic focusing apparatus for picking up of an image of an object.

BACKGROUND ART

Conventionally, as automatic focusing (AF) technologies in image pickup apparatus such as cameras and video cameras, various proposals have been made. For example, there is proposed phase difference autofocus using a through the lens (TTL) method in which a separating unit is provided in an optical path in an imaging optical system, and a focusing state is detected using a separated beam to perform autofocus control. In addition, there is also proposed external ranging autofocus using a non-TTL method in which a beam which does not enter nor pass through the imaging optical system is used. Further, there is proposed image autofocus using so-called hill climbing method in which an image signal output from an image pickup element is used to compute a focus evaluating value. Further, there is proposed a hybrid autofocus system in which the image autofocus is combined with the phase difference autofocus or the external ranging autofocus.

In focus detecting apparatus using the TTL method such as the phase difference autofocus or the non-TTL method such as the external ranging autofocus, a phase difference is determined by performing correlation computation using an image signal output from the focus detecting apparatus. In this case, a true focusing point is determined using a degree of coincidence between two images as a correlated evaluating value. In general, a defocus amount with respect to a focusing proposed point is determined based on a phase difference with which the correlated evaluating value takes an extreme and maximum value. However, in a case where data obtained from the focus detecting apparatus has a cyclic pattern, multiple focusing proposed points that have substantially identical correlated evaluating values are computed when focus detecting computation is performed. Consequently, it has been difficult to obtain a true focusing target position.

Patent Literature 1 proposes a method in which, when an object having a cyclic pattern is detected, a point where a contrast value of data output from a phase difference sensor takes a maximum value is assumed to be a true focusing point, and individual focusing proposed points are searched for the true focusing point. In addition, in each of the hybrid autofocus systems of Patent Literatures 2, 3 and 4, there is proposed a method involving searching for the focusing point at which contrast takes a maximum value by using only the image autofocus for an object having the cyclic pattern.

CITATION LIST

Patent Literature

PTL 1: Japanese Patent Application Laid-open No. S63-262611
PTL 2: Japanese Patent Application Laid-Open No. 2006-301150
PTL 3: Japanese Patent Application Laid-Open No. 2007-264299
PTL 4: Japanese Patent Application Laid-Open No. 2009-063921

SUMMARY OF INVENTION

Technical Problem

However, each of the methods proposed in Patent Literatures 1, 2, 3 and 4 is a method involving searching for the final focusing point by using so-called hill climbing method using a contrast evaluating value, and it is therefore difficult to quickly achieve an in-focus condition. Further, in the case of the method of searching for the focusing point by using only the contrast evaluating value, when a focus adjusting unit is operated at high speed during the search, a sampling interval of the contrast evaluating values in an optical axis direction is increased, so that the true focusing point may be passed over. Consequently, in the case of shooting especially for moving images, it is highly possible that a person who picks up a moving image may feel unpleasant about the image picked up before achieving an in-focus state.

In view of the foregoing, an object of the present invention is to solve the above-mentioned problem, and to provide an automatic focusing apparatus having excellent usability by properly performing automatic focusing control on an object having a cyclic pattern.

Solution to Problem

In order to attain the above-mentioned object, according to the present invention, there is provided an automatic focusing apparatus including: an image pickup optical system including a focus lens unit; a focus position detecting unit for detecting a position of the focus lens unit; a focus driving unit for driving the focus lens unit; an image pickup unit for picking up an image of an object through use of a beam having passed through the image pickup optical system; a focus detecting unit for detecting focus information by a phase difference method through use of the beam from the object; a contrast acquiring unit for acquiring contrast evaluating value using an image pickup signal obtained by the image pickup unit; a focusing determining unit for determining whether or not an in-focus state is achieved based on the contrast evaluating value; a cyclic pattern determining unit for determining whether or not the object has a cyclic pattern based on focus information provided by the focusing detecting unit; a target position setting unit for setting a target position of the focus lens unit; and a focusing direction determining unit for determining a direction of an in-focus point, in which, when the cyclic pattern determining unit determines that the object has the cyclic pattern, the focusing direction determining unit determines the direction of the in-focus point, the target position setting unit sets the target position of the focus lens unit in the direction of the in-focus point, the focus driving unit drives the focus lens unit toward the target position, and the focusing determining unit determines whether or not an in-focus state is achieved.

Advantageous Effects of Invention

According to the present invention, the effect of automatic focusing with excellent usability for an object having a cyclic pattern can be obtained by properly setting automatic focusing operations.

BRIEF DESCRIPTION OF DRAWINGS

FIG. 3 is Flowchart 1 of processes in the first embodiment.

DESCRIPTION OF EMBODIMENTS

Embodiments of the present invention are described in detail hereinbelow based on the accompanying drawings.

First Embodiment

Figure 1:
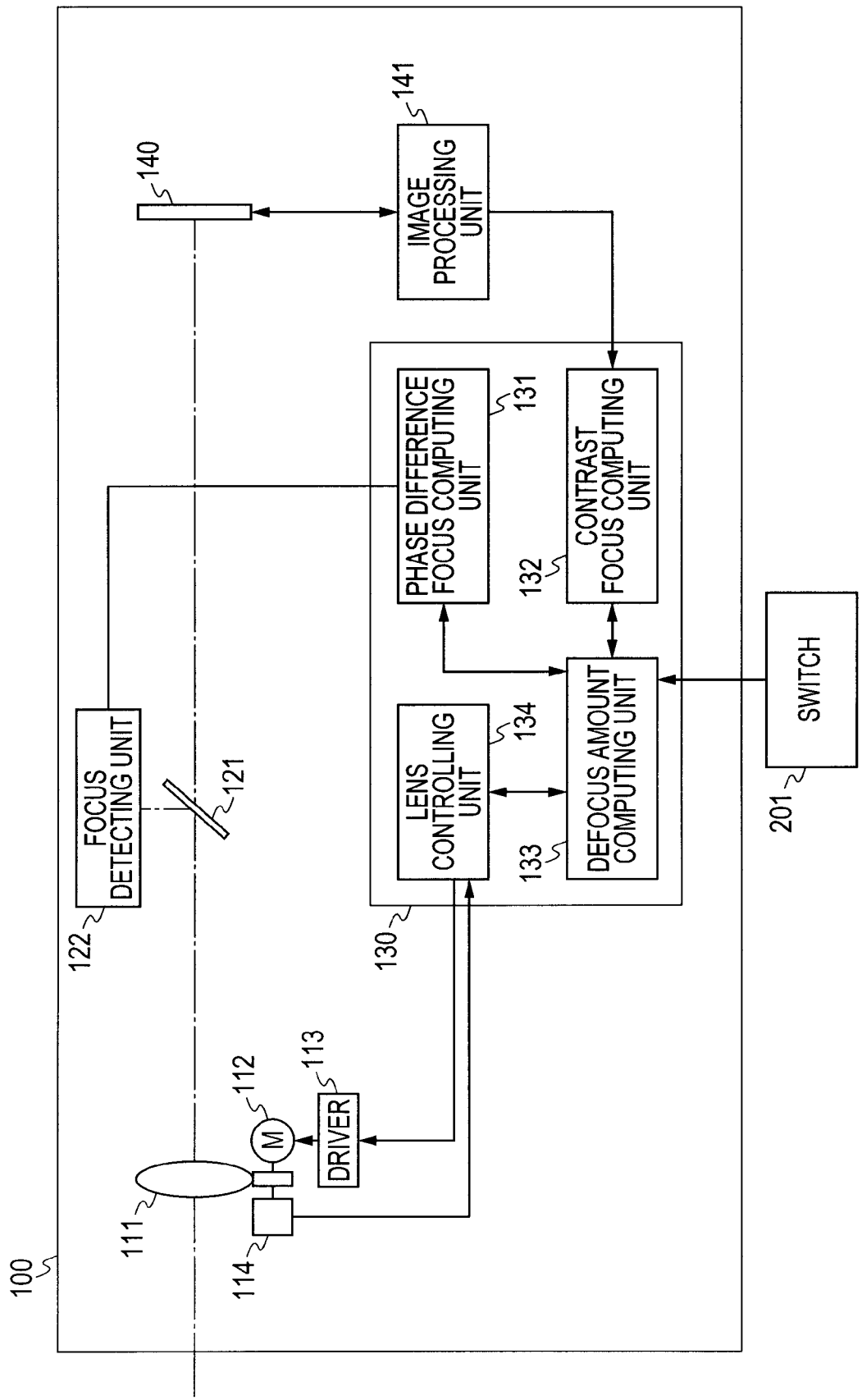
FIG. 1 is a structural view of a system in a first embodiment of the present invention.

FIG. 1 illustrates a structure of an automatic focusing apparatus 100 in a first embodiment of the present invention.

The automatic focusing apparatus 100 includes a focus lens unit 111 constituting an image pickup optical system, and a focus motor 112 as a focus driving unit is connected to the focus lens unit 111. The focus motor 112 is driven by a focus driver 113 to move the focus lens unit 111 in an optical axis direction. The position of the focus lens unit 111 is detected by a focus position detecting unit 114.

On an image plane side of the focus lens unit 111, a half mirror 121 is disposed. A beam having entered the image pickup optical system passes through the focus lens unit 111, and is divided into a beam passing through the half mirror 121 and a beam reflected by the half mirror 121. The beam having passed through the half mirror 121 enters an image pickup element 140. The image pickup element 140 is a charge storage type image sensor, and is constituted by a CMOS sensor or a CCD sensor. The beam reflected on the half mirror 121 enters a focus detecting unit 122 disposed at a position conjugate with the image pickup element 140.

The focus detecting unit 122 includes multiple pairs of secondary imaging lenses (not shown), and an autofocus sensor as a phase difference sensor (not shown). Multiple area sensors are provided in the autofocus sensor. The beam having passed through the half mirror 121 is divided into two and forms a pair of object images (hereinafter, referred to as two images) on each of the multiple area sensors by each of the multiple pairs of secondary imaging lenses. Each of the multiple area sensors photoelectrically converts the two images, and outputs two image signals. From the two image signals, a phase difference according to a focus state of the automatic focusing apparatus 100 can be obtained.

When the automatic focusing apparatus 100 is in focus for a particular object at a specific distance, a phase difference corresponding to an interval between the two images indicates a specific value. When the focusing of the automatic focusing apparatus 100 is achieved on the side closer to the image plane with respect to the object, i.e., in the case of so-called front focus, the phase difference is smaller than the specific value. On the other hand, when the focusing thereof is achieved on the side farther from the image plane with respect to the object, i.e., in the case of so-called rear focus, the phase difference is larger than the specific value. In this manner, the focus detecting unit 122 has a function of detecting the phase difference between object images formed by the light entering the automatic focusing apparatus 100.

A CPU 130 includes a phase difference focus computing unit 131, a contrast focus computing unit (contrast acquiring unit) 132, a defocus amount computing unit 133, and a lens controlling unit 134. The two image signals output from the focus detecting unit 122 are input to the phase difference focus computing unit 131. In addition, an image pickup signal output from the image pickup element 140 is converted to an image signal by an image processing unit 141, and the image signal is input to the contrast focus computing unit 132. In this embodiment, a description is given assuming an update period of the image signal to be 16 milliseconds.

The phase difference focus computing unit 131 performs correlative computation on the two image signals output from the focus detecting unit 122 to compute the phase difference between the image signals. The degree of coincidence between two images is used as a correlated evaluating value. The phase differences with which the correlated evaluating values take extreme values are set as focusing proposed points. Further, among the individual focusing proposed points, the point at which the correlated evaluating value takes a maximum value is set as the most promising focusing proposed point.

The contrast focus computing unit 132 obtains the image signal output from the image processing unit 141, and extracts a high frequency component from the image signal. Subsequently, the contrast focus computing unit 132 generates a contrast evaluating value indicating a contrast state of the object image from the high frequency component. The image signal output from the image processing unit 141 is periodically updated. The contrast focus computing unit 132 generates the contrast evaluating value in synchronization with the update period of the image signal. Then, the contrast focus computing unit 132 determines that the point at which the contrast evaluating value takes a maximum value is the focusing point.

The defocus amount computing unit 133 computes a defocus amount of the focus lens unit 111 based on the computation results of the phase difference focus computing unit 131 and the contrast focus computing unit 132.

Thus, multiple defocus amounts are computed using the phase difference sensor provided in the focus detecting unit 122. The computed defocus amounts are input to the lens controlling unit 134. The lens controlling unit 134 obtains the position of the focus lens unit 111 using the focus position detecting unit 114. Subsequently, the lens controlling unit 134 drives the focus lens unit 111 to a target position according to the defocus amounts computed by the defocus amount computing unit 133 (target position setting unit). At this point, the lens controlling unit 134 drives the focus motor 112 via the focus driver 113 to move the focus lens unit 111 so that the focus lens unit 111 is moved to the computed target position in the optical axis direction. In this manner, automatic focusing is performed.

Figure 2A:
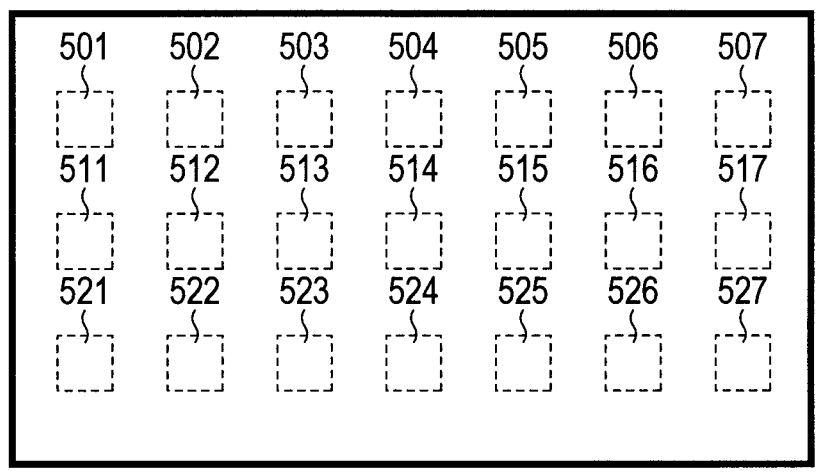
FIG. 2A is a structural view of an autofocus sensor in the first embodiment.

Herein, FIG. 2A illustrates an example of focus detecting areas in an image taking screen. The individual focus detecting areas 501 to 527 are illustrated in FIG. 2A. FIG. 2A illustrates an example in which 21 in total focus detecting areas are included with disposed seven focus detecting areas laterally arranged in each of an upper portion, a middle portion, and a lower portion of a photographing range, respectively. The focus detecting areas 501 to 507 are provided in the upper portion in order from the left side, the focus detecting areas 511 to 517 are provided in the middle portion in order from the left side, and the focus detecting areas 521 to 527 are provided in the lower portion in order from the left side.

The defocus amount computing unit 133 stores and retains positions (coordinates) of multiple focus detecting areas preset in the image taking range (image acquiring screen) in which an image can be taken, and shapes (sizes) of the focus detecting areas. By changing the settings, the positions of the focus detecting areas, the sizes thereof, and the like can be changed. In this embodiment, it is assumed that the focus detecting areas are selected by using a switch 201 of FIG. 1.

Figure 2B:
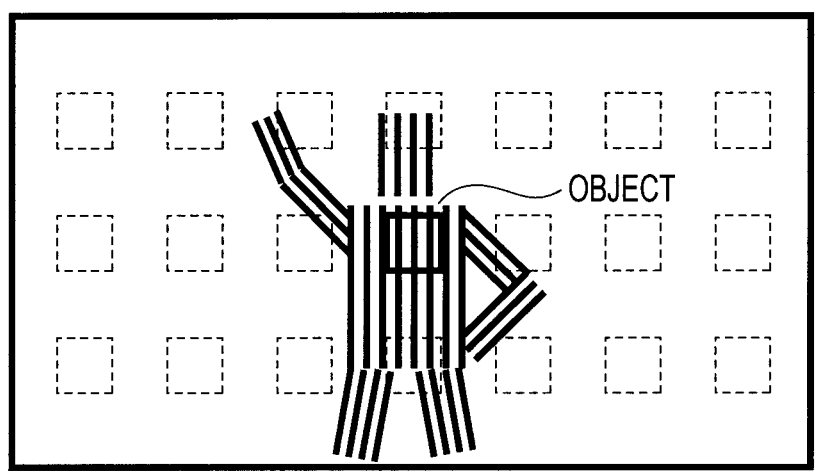
FIG. 2B is a view illustrating an example of a shot image in the first embodiment.

FIG. 2B illustrates a shot image in which an object is photographed with the focus detecting area 514 illustrated in FIG. 2A being selected. As illustrated in FIG. 2B, the object has a so-called stripe pattern and hence a cyclic pattern. In the first embodiment, an example in which focusing on an object having the cyclic pattern is performed in an image taking composition illustrated in FIG. 2B is described.

FIG. 3 is a flowchart illustrating a flow of automatic focusing processes in the automatic focusing apparatus 100. The CPU 130 controls those processes according to a computer program stored in a memory (not shown).

When the power of the automatic focusing apparatus 100 is turned on, the processes of the CPU 130 are executed from Step S101. In Step S101, the lens controlling unit 134 obtains a position F(0) of the focus lens unit 111 via the focus position detecting unit 114.

Next, the CPU 130 proceeds to Step S102 to select a focus detecting area selected by the switch 201, and activate the phase difference sensor in the focus detecting unit 122. Subsequently, the CPU 130 proceeds to Step S103.

Figure 4:
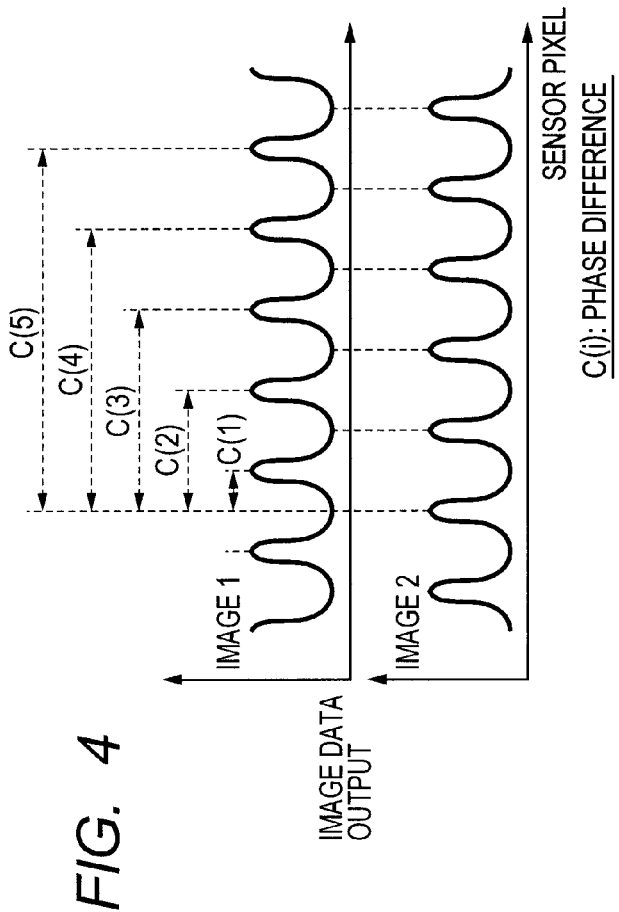
FIG. 4 is a view illustrating an example of an output value of a phase difference sensor in the first embodiment.
Figure 5:
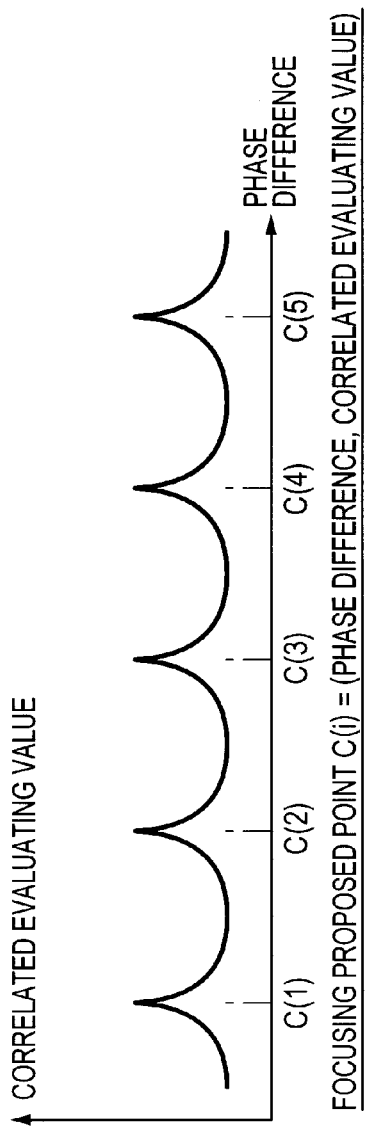
FIG. 5 is a view illustrating an example of a correlated evaluating value in the first embodiment.

In Step S103, the phase difference focus computing unit 131 obtains two image signals from the focus detecting unit 122, and computes the phase difference in the focus detecting area 514 selected by the switch 201. FIGS. 4 and 5 illustrate examples of the two image signals, and the phase difference and the correlated evaluating value as computed focus information during the process described above, respectively. The object has the cyclic pattern as described above, and hence waveforms illustrated in FIG. 4 are obtained from image data obtained from the focus detecting area 514. In this case, the correlated evaluating values indicating the degree of coincidence between two images of each phase difference can be plotted as illustrated in FIG. 5. As illustrated in FIG. 5, focusing proposed points C(1) to C(5) each having the phase difference and its correlated evaluating value as parameters are obtained. The number of focusing proposed points and an index of each focusing proposed point are stored.

When the object has no cyclic pattern, differences among the correlated evaluating values at the respective individual focusing proposed points are produced, and hence the true focusing proposed point can be selected. However, the characteristic of the case where the object has the cyclic pattern is that the individual correlated evaluating values take substantially equal values, as illustrated in FIG. 5. Accordingly, even when C(3) is a true focusing point, the correlated evaluating value of C(3) is substantially equal to other correlated evaluating values, and hence it is difficult to determine which one of C(1) to C(5) is the true focusing proposed point.

The description returns to the flowchart of FIG. 3. Next, the process flow proceeds to Step S120 in which the phase difference focus computing unit 131 (cyclic pattern determining unit) determines whether or not the object has the cyclic pattern. Herein, the description is given by taking, as an example, a method in which it is determined that the cyclic pattern is present when the difference among the respective correlated evaluating values of the above-mentioned focusing proposed points C(1) to C(5) fall within a predetermined range.

Figure 6:
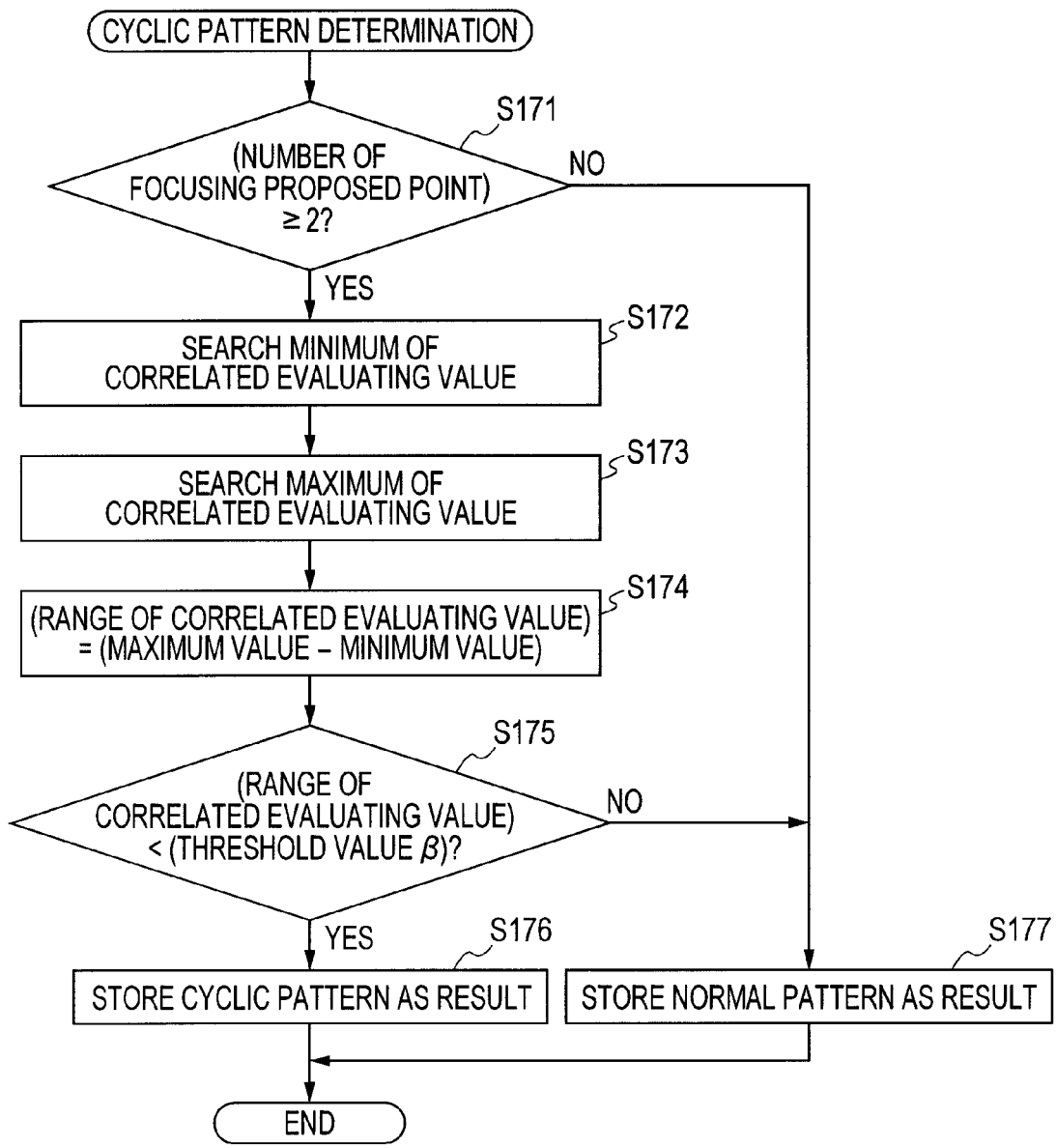
FIG. 6 is Flowchart 2 of processes in the first embodiment.

FIG. 6 illustrates a flowchart of a subroutine indicating an example of the cyclic pattern determination. First, in Step S171, it is determined whether or not the number of focusing proposed points computed in Step S103 is 2 or more. When the number of focusing proposed points is 2 or more, the process flow proceeds to Step S172, while when the number thereof is less than 2, the process flow proceeds to Step S177. In Step S172 and Step S173, the minimum value and the maximum value of the individual correlated evaluating values are searched for and stored. Next, the process flow proceeds to Step S174 in which the difference between the minimum and maximum values of the correlated evaluating values obtained in Steps S172 and S173 is calculated, and the difference is stored as a correlated evaluating value range. Subsequently, the process flow proceeds to Step S175 in which the correlated evaluating value range is compared with a predetermined threshold value β. In Step S175, in a case where the correlated evaluating value range is less than the threshold value β, the result is determined to be true, and the process flow proceeds to Step S176. When the evaluation result is false in Step S175, the process flow proceeds to Step S177. In Step S176, the result that the cyclic pattern is present is stored, and the subroutine for the cyclic pattern determination is ended. In Step S177, the result that a normal pattern is present is stored, and the subroutine for the cyclic pattern determination is ended. Note that, β is an arbitrary value, and a predetermined value may be written into a program for β in advance, or a structure may be adopted in which specification and selection of a value for β can be externally performed by providing a volume or a switch (not shown).

The description returns to the flowchart of FIG. 3. As the result of the determination in Step S120, when it is determined that the cyclic pattern is present, the process flow proceeds to Step S121. In Step S120, when it is determined that the cyclic pattern is not present, the process flow proceeds to Step S150.

In Step S121, a focusing direction determination is performed. Herein, the direction determination is performed by taking a flowchart of FIG. 7 as an example. First, in Step S181, it is determined whether or not the position F (0) of the focus lens unit 111 detected in Step S101 by the lens controlling unit 134 is located on an infinite side with respect to an entire focus area. When the determination result in Step S181 is true, i.e., when the position F(0) is located on the infinite side, the focusing direction is set to a close side in Step S182, and the process is ended. On the other hand, when the determination result in Step S181 is false, i.e., when the position F(0) is located on the close side, the focusing direction is set to the infinite direction in Step S183, and the process is ended. For example, the position F (0) of the focus lens unit is located further on the infinite side than a middle point in a movable range, the focusing direction may be set to the close side, while when the position F(0) thereof is located further on the close side than the middle point in the movable range, the focusing direction may be set to the infinite direction.

The description returns to the flowchart of FIG. 3. Next, the process flow proceeds to Step S122 in which the defocus amount computing unit 133 sets the closest focusing proposed point among the focusing proposed points corresponding to the focusing direction determined in Step S121 in a variable i.

Figure 8:
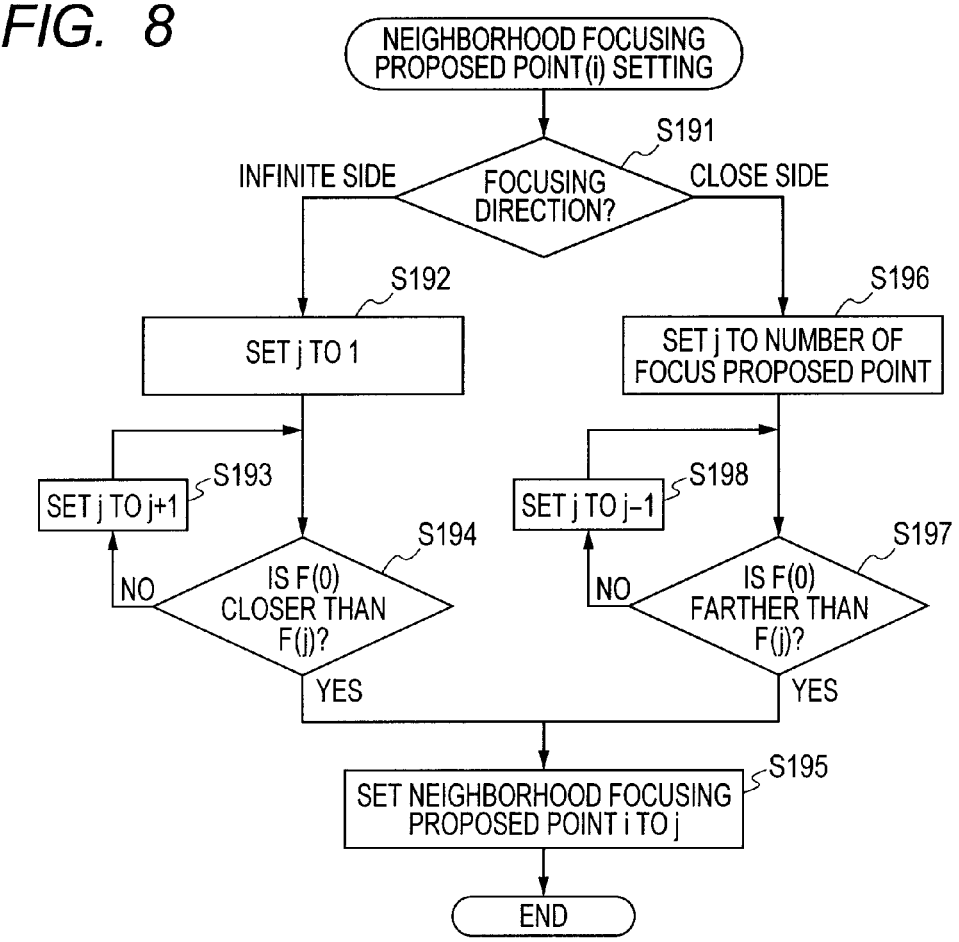
FIG. 8 is Flowchart 4 of processes in the first embodiment.

FIG. 8 illustrates a subroutine in Step S122. First, in Step S191, the focusing direction determined in Step S121 is referred to. When the focusing direction is the infinite direction, the process flow proceeds to Step S192, while when the focusing direction is the close side, the process flow proceeds to Step S196. In Step S192, a value 1 is set to an index variable j, and the process flow proceeds to Step S194. In Step S194, the defocus amount computing unit 133 computes a focusing proposed position F (j) of the focus lens unit 111 corresponding to a focusing proposed point C(j). Subsequently, the positional relation between F(0) and F(j) is determined. When F(0) is closer than F(j), i.e., when the determination result is true, the process flow proceeds to Step S195. On the other hand, when the determination result in Step S194 is false, the process flow proceeds to Step S193. In Step S193, the index variable j is incremented. Then the processes are executed again from Step S194. In Step S196, the number of focusing proposed points is set in the index variable j. That is, an index corresponding to the focusing proposed point having the last index among the focusing proposed points computed in Step S103 of FIG. 3 is set to the variable j. Subsequently, the process flow proceeds to Step S197 in which, similarly to Step S194, F(j) is computed, and the positional relation between F(0) and F(j) is determined. When F(0) is located farther than F(j), i.e., when the determination result is true, the process flow proceeds to Step S195, while when the determination result is false, the process flow proceeds to Step S198. In Step S198, the index variable j is decremented, and the processes are executed again from Step S197. In Step S195, the index variable j is set to the variable i as a neighbor focusing proposed point, and the subroutine is ended.

Figure 9:
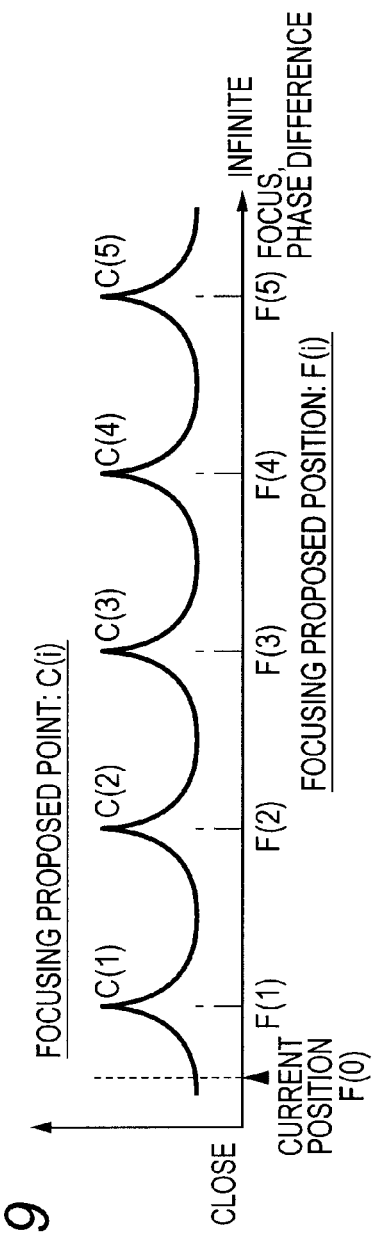
FIG. 9 is a view illustrating an example of a focusing proposed point in the first embodiment.

Herein, FIG. 9 illustrates each focusing proposed point C(i) and each position F(i) of the focus lens unit corresponding to C(i). For example, as illustrated in FIG. 9, when the position F(0) of the focus lens unit 111 detected in Step S101 is located at the position on the close side, the focusing direction determination in Step S121 indicates the focusing direction being the infinite direction. Further, in Step S122, the index of the focusing proposed point closest to F(0) is 1, and a value 1 is set to the variable i.

Next, in Step S123, the defocus amount computing unit 133 computes the defocus amount and a driving speed of the focus lens unit 111, and computes the focusing proposed position F(i) of the focus lens unit 111 corresponding to the focusing proposed point C(i) as a target position. Each F(i) corresponding to each C(i) has a relation as illustrated in FIG. 9. Details of a method of determining the defocus amount and the driving speed are described later. Next, the process flow proceeds to Step S124 in which the lens controlling unit 134 drives the focus lens unit 111 to the focusing proposed position F(i) at the above-described driving speed using the focus driver 113 and the focus motor 112. Thereafter, in Step S125, the contrast focus computing unit 132 obtains the image signal from the image processing unit 141, and computes the high frequency component and a contrast evaluating value V(i) of an area corresponding to the focus detecting area selected in Step S102.

Subsequently, the process flow proceeds to Step S130 in which it is determined whether or not the contrast evaluating value V(i) obtained in Step S125 is larger than a predetermined threshold value α. When V(i) is larger than the threshold value α, it is determined that an in-focus condition is achieved, and the process flow returns to Step S101, and the processes are executed again. On the other hand, when V(i) is equal to or smaller than the threshold value α, it is determined that an in-focus condition has not been achieved, and the process flow proceeds to Step S140. Note that, α is an arbitrary value, and a predetermined value may be written into a program for α in advance, or a structure may also be adopted in which specification and selection of a value for α can be externally performed by providing a volume or switch (not shown). A focusing determination method in Step S130 is described later.

In Step S140, it is determined whether or not the focusing determinations has been carried out for a number of times that matches the number of focusing proposed points corresponding to the focusing direction determined in Step S121. When the determination result in Step S140 is true, the processes are executed again from Step S101. When the determination result in Step S140 is false, the process flow proceeds to Step S141 in which the next focusing proposed point corresponding to the focusing direction determined in Step S121 is set in the variable i. That is, the focusing proposed position that is located further in the focusing direction than the position of the current focus lens unit 111 and is closest to the current focus lens unit 111 is set as the target position of the focus lens unit. Then the processes are executed again from Step S123.

Figure 10:
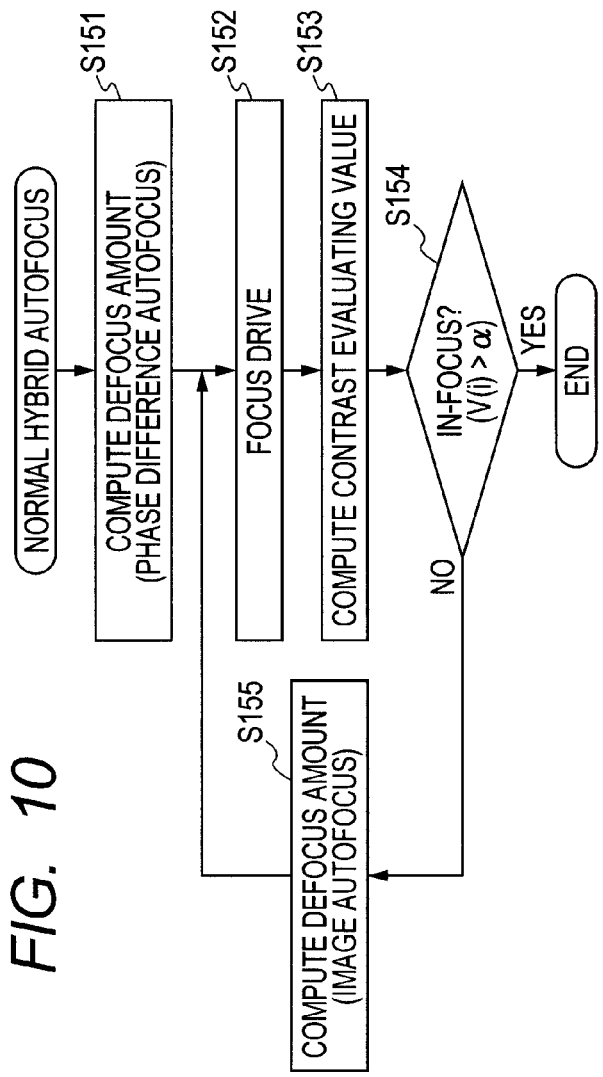
FIG. 10 is Flowchart 5 of processes in the first embodiment.

In Step S150, normal hybrid automatic focusing processes in a case where the object has no cyclic pattern are executed. Automatic focusing using a hybrid method of a phase difference method and a contrast method is well-known, and hence a flowchart of a subroutine is illustrated in FIG. 10 as a simple example. First, in Step S151, among the focusing proposed points computed by the phase difference focus computing unit 131, the focusing proposed point having the largest correlated evaluating value is selected. Subsequently, the target position of the focus lens unit 111 is computed by the defocus amount computing unit 133. Next, in Step S152, the lens controlling unit 134 drives the focus lens unit 111 using the focus driver 113 and the focus motor 112. Subsequently, in Step S153, the contrast focus computing unit 132 takes the image signal from the image processing unit 141, and computes the contrast evaluating value. Then, in Step S154, the focusing determination is performed similarly to Steps S110 and S130. When an in-focus condition is achieved, the present subroutine is ended. When an in-focus condition is not achieved, the process flow proceeds to Step S155. In Step S155, the defocus amount for performing so-called hill climbing determination using the contrast evaluating value is computed. Subsequently, the processes are repeatedly executed from Step S152 until an in-focus condition is achieved.

Figure 11:
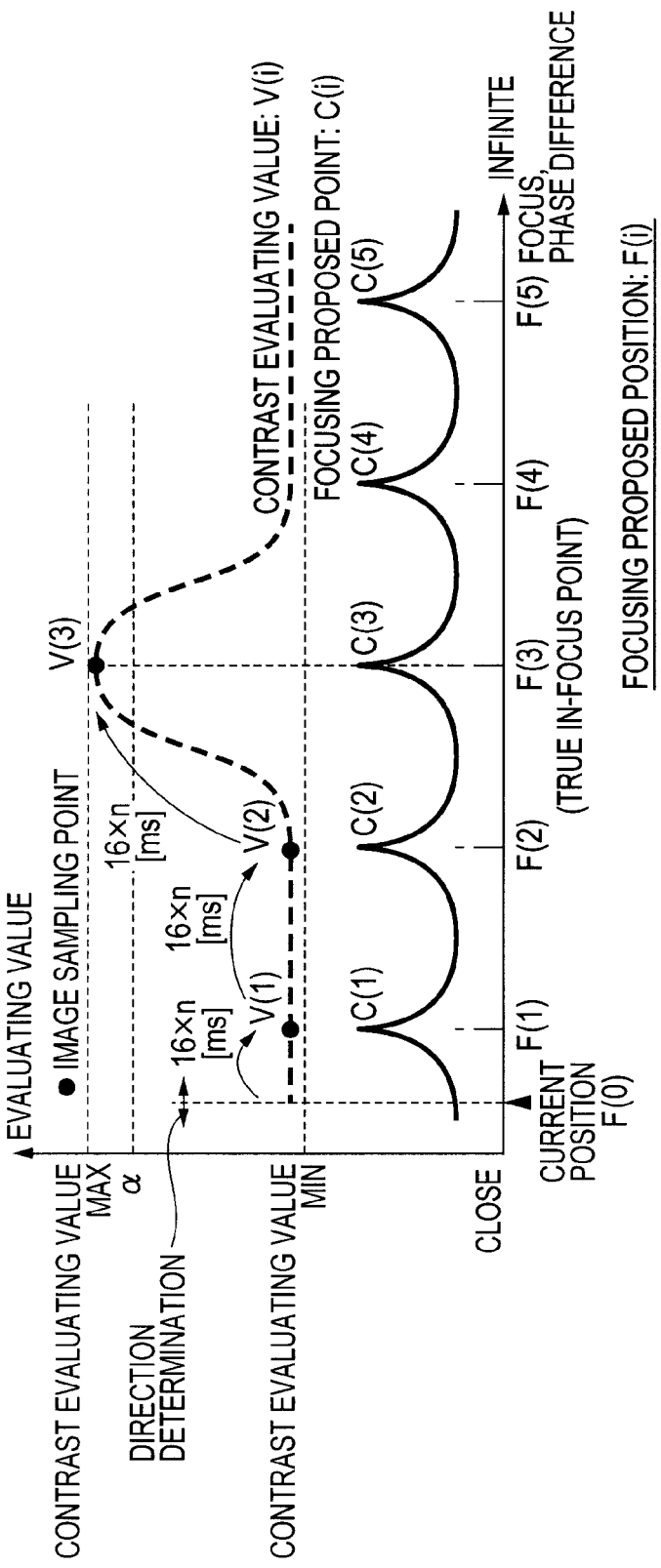
FIG. 11 is a view illustrating examples of the focusing proposed point and a contrast evaluating value in the first embodiment.

Herein, the process from the computation of the defocus amount and the driving speed to the determination of the focus condition when the determination result is true in Step S120 of the flowchart illustrated in FIG. 3, i.e., when it is determined that the cyclic pattern is present, is described. FIG. 11 illustrates the process until an in-focus state is obtained when this embodiment is applied in the case where the initial position $F(0)$ of the focus lens unit 111 is positioned on the close side. The horizontal axis of FIG. 11 indicates the focusing proposed point $C(i)$ computed by the phase difference focus computing unit 131, and the focusing proposed position $F(i)$ of the focus lens unit 111 corresponding to each $C(i)$. The vertical axis of FIG. 11 indicates the correlated evaluating value of the focusing proposed point $C(i)$ based on the phase difference, and the contrast evaluating value $V(i)$ computed by the contrast focus computing unit 132. $F(0)$ of FIG. 11 denotes the position of the focus lens unit 111 detected by the lens controlling unit 134 in Step S101. When Step S123 is executed, in a case where i=1 is assumed to be satisfied in Step S122, the target position of the focus lens unit 111 is set at $F(1)$. In addition, the lens controlling unit 134 determines the driving speed of the focus lens unit 111 such that the image output from the image processing unit 141 is updated when the focus lens unit 111 reaches the position $F(1)$, and drives the focus lens unit 111 in Step S124. As described above, when the update period of the image output from the image processing unit 141 is assumed to be 16 milliseconds, the driving is performed such that Step S125 is executed after a lapse of an integral multiple of 16 milliseconds to obtain the contrast evaluating value $V(1)$. Then the focusing determination is performed based on the contrast evaluating value $V(1)$ in Step S130. The contrast evaluating value $V(1)$ is smaller than a, and hence $F(2)$ as the next focusing proposed position is set as the target position in Steps S140 and S141, and the same processes are executed from Step S123. When i=3 is satisfied, the constant evaluating value $V(3)$ is larger than a, so that it is determined that focusing is achieved in Step S130, and the process is ended.

Figure 12:
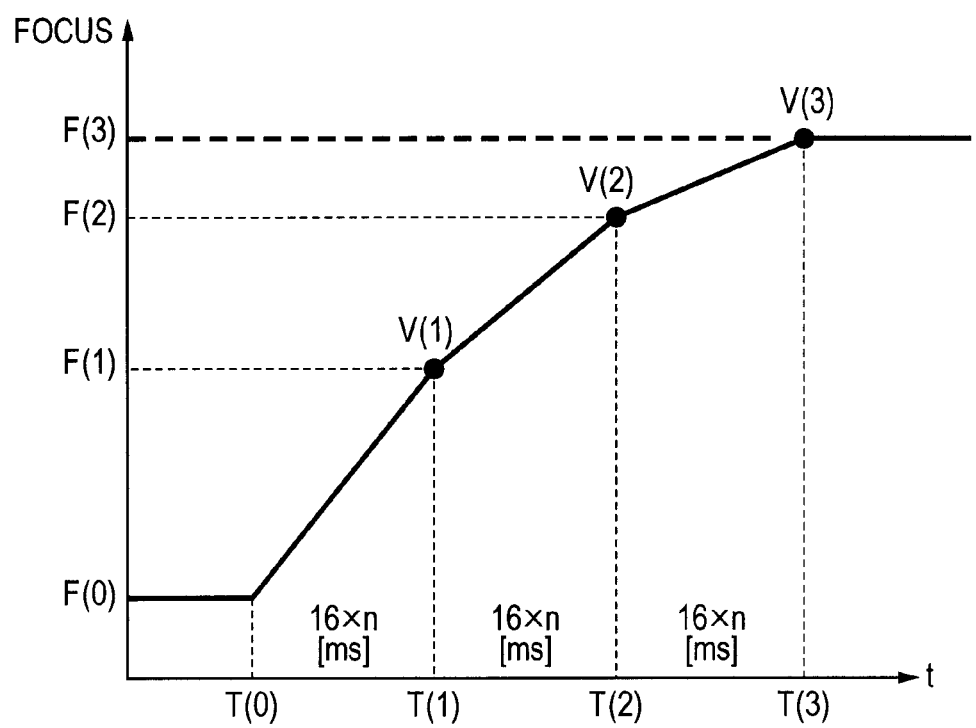
FIG. 12 is a view illustrating change in focus in the first embodiment.

FIG. 12 illustrates the locus of the focus lens unit 111. In FIG. 12, the horizontal axis indicates time, while the vertical axis indicates the position of the focus lens unit 111. As illustrated in FIG. 12, from time $T(0)$ to time $T(3)$, the focus lens unit 111 is driven from the position $F(0)$ to the position $F(3)$, and the contrast evaluating values $V(0)$ to $V(3)$ are obtained. When it is determined that an in-focus condition is not achieved at a given focusing proposed point, the focus lens unit 111 can be immediately driven to the next focusing proposed point without reducing the driving speed of the focus lens unit 111 at the given focusing proposed point. In addition, according to the defocus amount (focusing evaluating value) at each of the focusing proposed points, the driving speed of the focus lens unit 111 is variable. That is, it is preferred to set the driving speed of the focus lens unit 111 faster as the defocus amount is larger (the focusing proposed point is farther from the in-focus position).

Thus, in this embodiment, in synchronization with the image update period of the image processing unit 141, the focus lens unit 111 is driven to the focusing proposed position $F(i)$ (focusing proposed point $C(i)$) while controlling the position and the velocity of the focus lens unit 111, whereby contrast evaluating can be performed only on a focusing proposed point neighborhood. That is, it is not necessary to perform the contrast evaluation on areas between the individual focusing proposed points, and hence it is not necessary to reduce the driving speed of the focus lens unit in order to perform the contrast evaluation, so that time required to reach the true focusing point can be shortened. Consequently, the speed of the automatic focusing processes on the object having the cyclic pattern can be increased on comparison with conventional automatic focusing processes. Further, by setting the threshold value $\alpha$, it is not necessary to search all focusing proposed points, so that focusing can be achieved at high speed.

Figure 7:
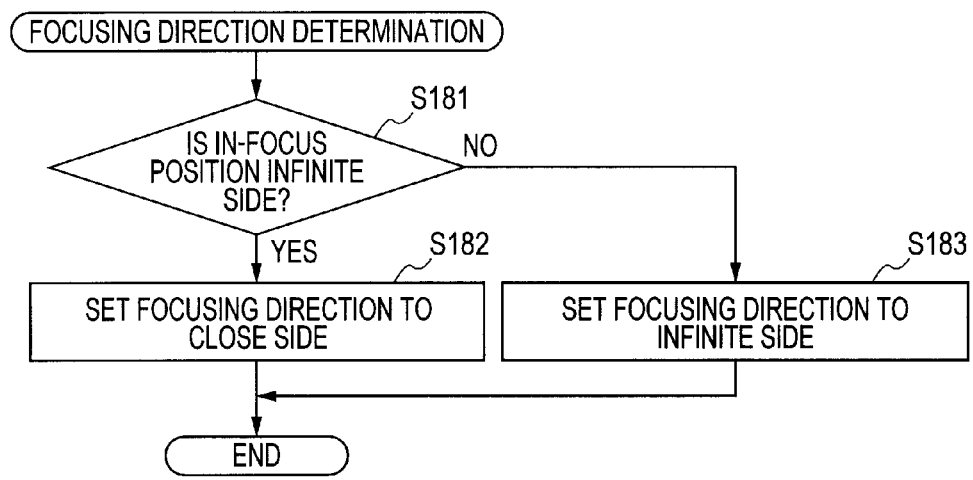
FIG. 7 is Flowchart 3 of processes in the first embodiment.

Note that, the method of the focusing direction determination in this embodiment may adopt methods other than the method illustrated in FIG. 7. For example, the focusing direction may also be determined from the relation between the initial position $F(0)$ of the focus lens unit 111 and the set of the focusing proposed positions $F(i)$.

Second Embodiment

In a case where the phase difference of the object having the cyclic pattern is computed, the phase difference interval between the focusing proposed points is two pixels or more in principle on an assumption that a pixel of the phase difference sensor is used as a unit. In addition, sensitivity differs according to the position of the focus lens unit, and hence the defocus amount differs for each area between the focusing proposed points, as illustrated in FIG. 12. Therefore, in a case where the defocus amount is large, even when the focus lens unit is driven at a maximum possible driving speed, there is a possibility that the image update period of the image processing unit 141 arrives before the focus lens unit is driven to the next focusing proposed point. That is, in some cases, it is difficult to perform the contrast evaluation at the position of the focus lens unit corresponding to the focusing proposed point.

With this being the situation, the utilization of the contrast evaluating value of the image updated in an area other than the focusing proposed point allows a determination of whether or not the neighbor focusing proposed point is a true focusing point.

In this embodiment, a method for automatic focusing suitable for such situation is described.

The structure of the automatic focusing apparatus, the structure of the autofocus sensor, and the arrangement of the focus detecting areas in a second embodiment are the same as those of FIGS. 1 and 2A in the first embodiment, and hence descriptions thereof are omitted. A description is given referring to FIGS. 13 to 16 by taking the image taking scene of FIG. 2B as an example, similarly to the first embodiment.

Figure 13:
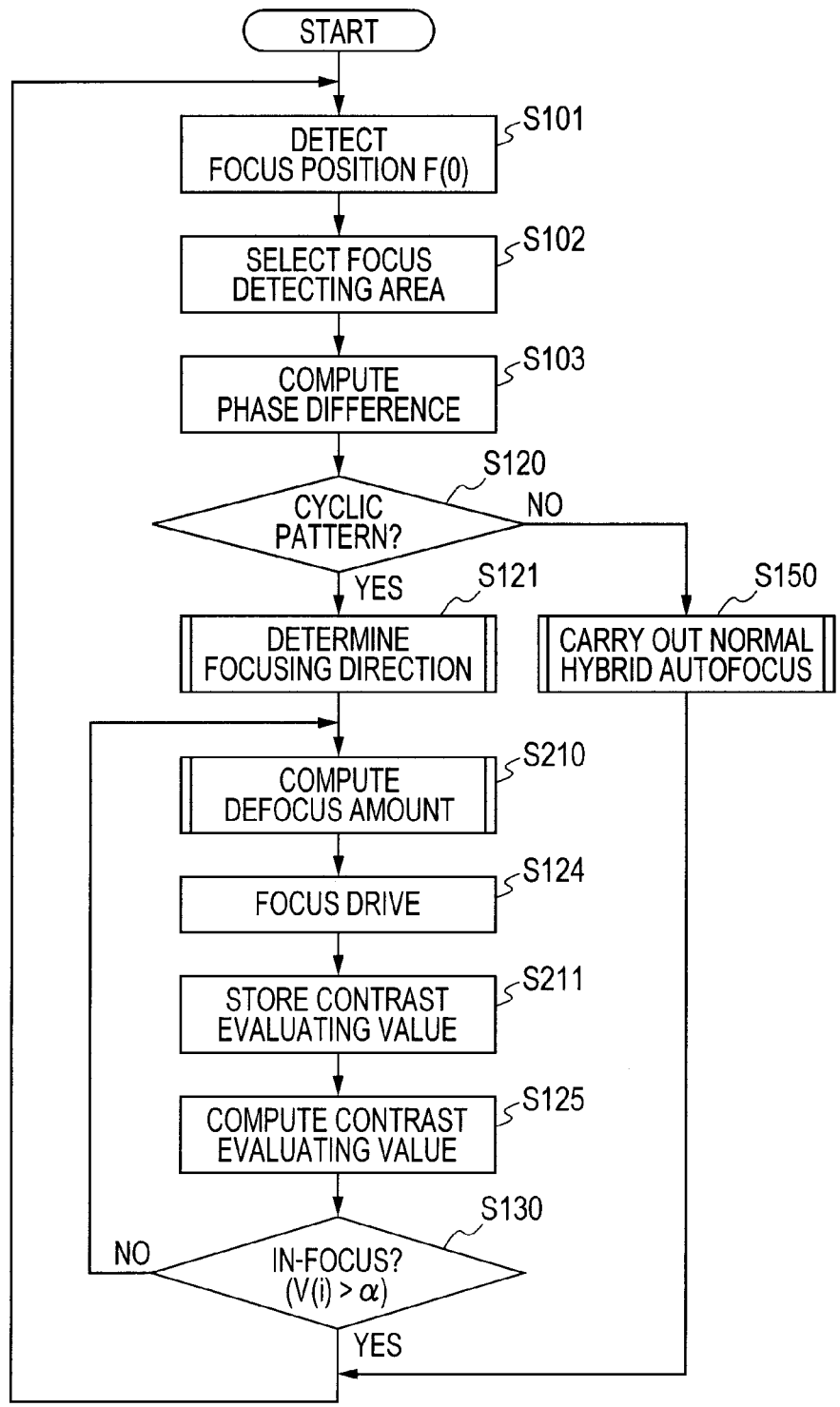
FIG. 13 is Flowchart 1 of processes in a second embodiment of the present invention.

FIG. 13 is a flowchart illustrating the flow of automatic focusing processes in the automatic focusing apparatus 100. The CPU 130 controls those processes according to a computer program stored in the memory (not shown).

In Steps S101 to S103 of FIG. 13, similarly to the first embodiment, the position $F(0)$ of the focus lens unit 111 is detected. In addition, in the focus detecting unit 122, the phase difference sensor selected by the switch 201 is activated. Next, the phase difference and the focusing proposed points of the focus detecting area 514 selected by the switch 201 are computed.

In Step S120, similarly to the first embodiment, the cyclic pattern determination is performed. When it is determined that the object has the cyclic pattern, the process flow proceeds to Step S121, while when it is determined that the object has no cyclic pattern, the process flow proceeds to Step S150. In Step S150, similarly to the first embodiment, the normal hybrid autofocus processes are performed, and the processes are repeated from Step S101. In Step S121, the determination of the focusing direction is performed, similarly to the first embodiment.

Figure 14:
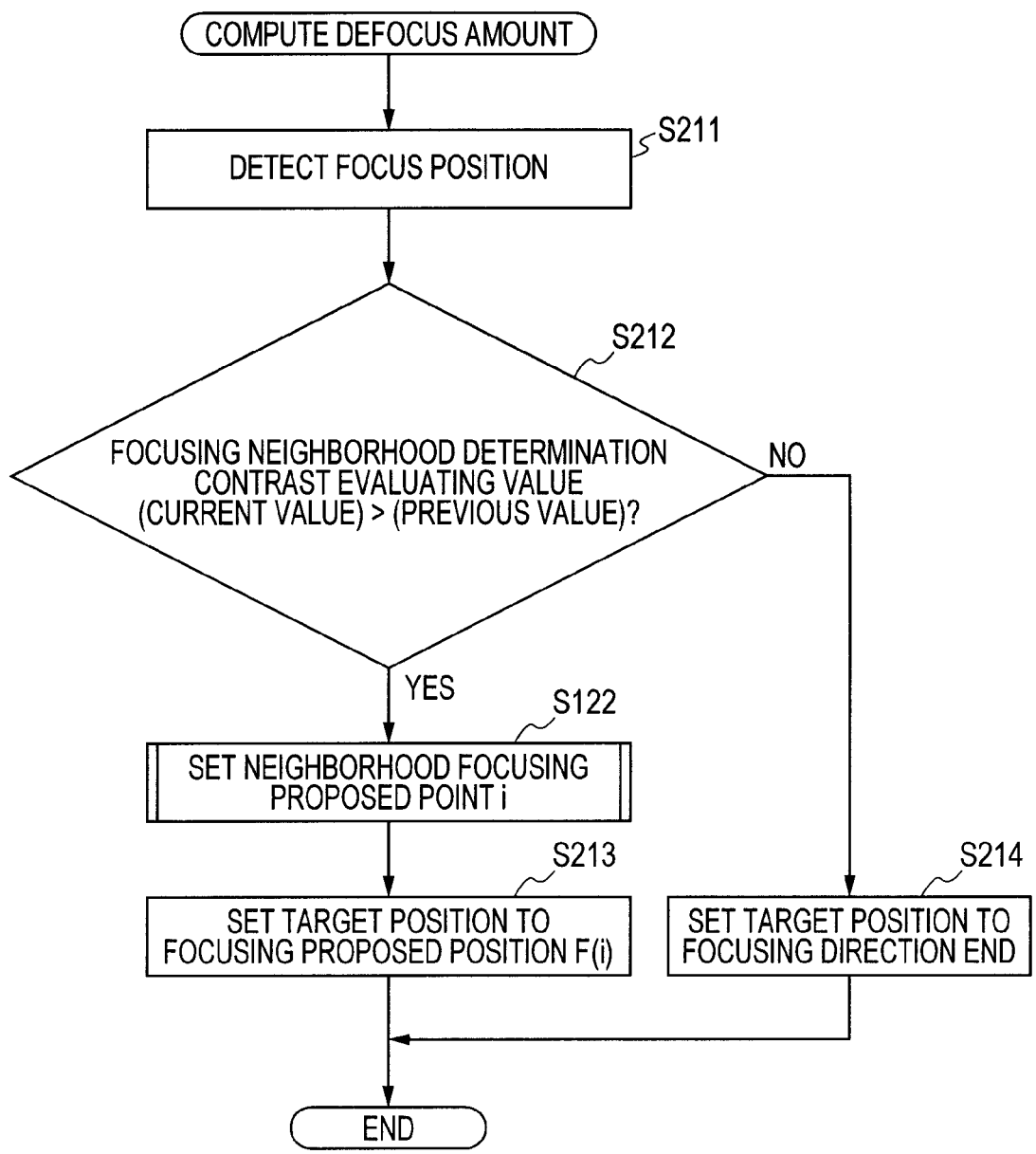
FIG. 14 is Flowchart 2 of processes in the second embodiment.

Subsequently, in Step S210, the defocus amount computing unit 133 performs the computation of the defocus amount. FIG. 14 illustrates a subroutine in Step 210. First, in Step S211, the lens controlling unit 134 detects the position of the focus lens unit 111. Next, in Step S212, an in-focus neighborhood determination is performed using the contrast evaluating value. When the determination result indicates that the present focus position is in the neighborhood of the in-focus position, the process flow proceeds to Step S122, while when the determination result does not indicate that the present focus position is in the neighborhood of the in-focus position, the process flow proceeds to Step S214. Details of a determination method in Step S212 are described later.

In Step S122, similarly to the first embodiment, a neighbor focusing proposed point i relative to the position of the focus lens unit 111 detected in Step S211 is set. Next, the process flow proceeds to Step S213 in which a neighbor focusing proposed position F(i) is set as the target position of the focus lens unit 111, and the subroutine is ended. Further, in Step S214, a focusing direction end determined in Step S121 is set as the target position, and the subroutine is ended. The focusing direction end refers to a limit of the position of the focus lens unit corresponding to the detected focus direction, i.e., the end thereof.

The description returns to the flowchart of FIG. 13. Next, the process flow proceeds to Step S124 in which the focus lens unit 111 is driven to the target position, similarly to the first embodiment. Subsequently, the process flow proceeds to Step S211 in which the previously computed contrast evaluating value is stored. The process flow proceeds to Step S125 in which the contrast evaluating value is computed, similarly to the first embodiment. Further, the process flow proceeds to Step S130 in which it is determined whether or not an in-focus condition is achieved, similarly to the first embodiment. When an in-focus condition is achieved, processes are executed again from Step S101, while when an in-focus condition is not achieved, the process flow returns to Step S210. The processes described above are repeatedly executed.

Herein, the process until an in-focus condition is achieved and the determination method in Step S212 of FIG. 14 when the flowchart of FIG. 13 is executed are described with reference to FIGS. 15 and 16. Similarly to FIG. 11 described in the first embodiment, in FIG. 15, the horizontal axis indicates the focusing proposed point C(i) and the focusing proposed position F(i) of the focus lens unit 111. In addition, the vertical axis of FIG. 15 similarly indicates the correlated evaluating value of the focusing proposed point C(i) and the contrast evaluating value V(i) thereof. In FIG. 16, the horizontal axis indicates time, and the vertical axis indicates the position of the focus lens unit 111, similarly to FIG. 12 described in the first embodiment.

Figure 15:
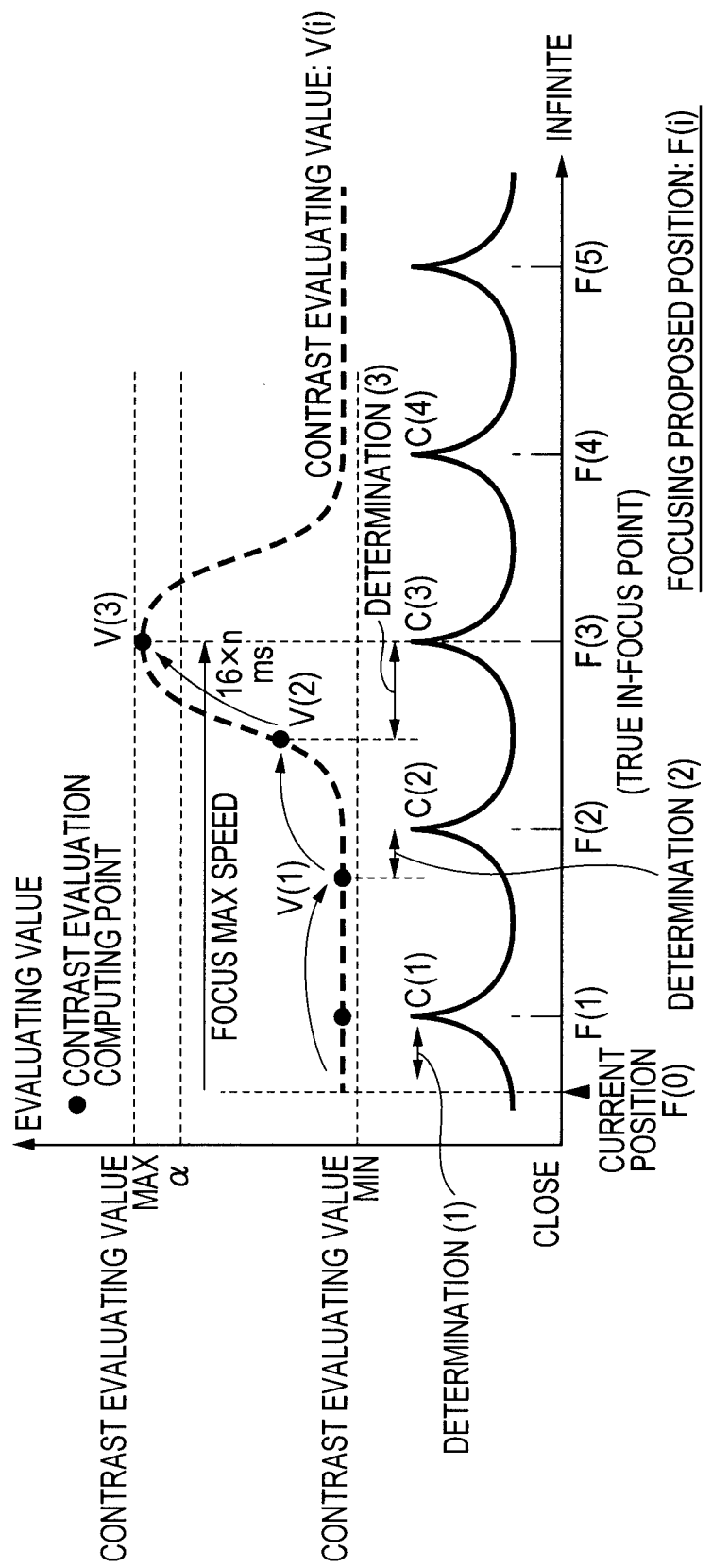
FIG. 15 is a view illustrating examples of a focusing proposed point and a contrast evaluating value in the second embodiment.
Figure 16:
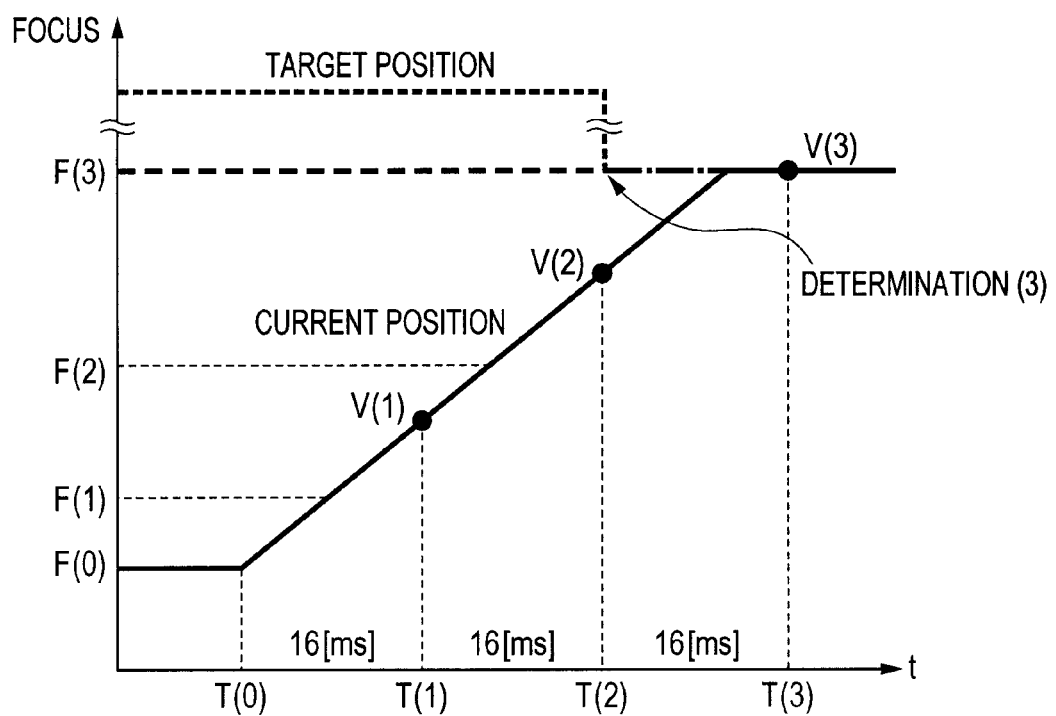
FIG. 16 is a view illustrating change in focus in the second embodiment.

Herein, at time T(0) of FIG. 16, it is assumed that the position F(0) of the focus lens unit 111 detected in Step S101
is located at positions illustrated in FIGS. 15 and 16. In addition, the true focusing position is assumed to be F(3). In this case, in Step S121, as the result of the focusing direction determination, it is determined that the focusing direction is the infinite direction. In Step S212 of FIG. 14 that is the subroutine in the next Step S210, it is determined whether or not the current position is in the neighborhood of the in-focus position by using the contrast evaluating value. In this process, the obtained latest contrast evaluating value V(i) is compared with the previous contrast evaluating value stored in Step S211. When the latest contrast evaluating value V(i) is larger than the previous contrast evaluating value, it is determined that the current position is in the neighborhood of the in-focus position. When the latest contrast evaluating value V(i) is the previous contrast evaluating value or less, it is determined that the current position is not in the neighborhood of the in-focus position. When i=0 is satisfied, the process flow proceeds to Step S214 in which the target position is set at an infinite side end, and the defocus amount computation is ended. Next, in Step S124, the focus lens unit 111 is driven toward the infinite side. Subsequently, at time T(1) of FIG. 16, in Step S125, a contrast evaluating value V(1) is computed.

Then, the focusing determination is performed in Step S130. As illustrated in FIG. 15, (the contrast evaluating value V(1))<(the threshold value α) is satisfied, and hence the process flow proceeds to Step S210. In the same manner, Steps S210 to S130 of FIG. 13 are repeatedly executed. Then, when i=2 is satisfied, in Step S212 of FIG. 14, the result that V(2)>V(1) is satisfied is obtained, and the process flow proceeds to Step S213. In Step S213, a neighbor focusing proposed position F(i) relative to the position of the focus lens unit 111 where V(2) is obtained, i.e., the position of the focus lens unit 111 detected in Step S211 is searched for. In other words, the focusing proposed position F(i) that is located further in the focusing direction than the position of the focus lens unit 111, and is closest to the position of the focus lens unit 111 is searched for, and set as the target position. From FIG. 15, i=3 is obtained, and F(3) is set as the target position. The process flow proceeds to Step S124 of FIG. 13 in which the focus lens unit 111 is driven to the target position F(3). In Step S124, in order to quickly achieve an in-focus state, it is assumed that the focus lens unit 111 is driven to the target position F(3) asynchronously with the image update period. Subsequently, the process flow proceeds to Step S125 in which a contrast evaluating value V(3) is obtained. Then, in the focusing determination in Step S130, (the contrast evaluating value V(3))>(the threshold value α) is satisfied, and it is determined that focusing is achieved. Herein, as illustrated in FIG. 16, when attention is paid to the locus of the focus lens unit 111 until focusing is achieved, it can be seen that the focus lens unit 111 is driven at a constant speed until an in-focus condition is achieved. Note that, the driving speed of the focus lens unit 111 from a position F(2) to the position F(3) may also be determined in synchronization with the update period of the image obtained from the image processing unit 141, as described in the first embodiment.

Thus, by utilizing the contrast evaluating value of the image updated in the area other than the focusing proposed point, it is determined whether or not the previous or subsequent focusing proposed point is the true focusing point, and the focus lens unit 111 can be thereby driven quickly to the in-focus position.

Third Embodiment

In the first and second embodiments, the case where the initial position of the focus lens unit 111 is on the close side is described. In those embodiments, the set of focusing proposed points is present in one direction with respect to the initial position F(0) of the focus lens unit 111, and hence the direction of the in-focus position can be uniquely determined. On the other hand, when the initial position of the focus lens unit 111 is located within the range of the focusing proposed points, it is difficult to uniquely determine the direction of the in-focus position. With this being the situation, by obtaining the contrast evaluating value in the neighborhood of the initial position F(0), the direction determination of the in-focus position can be performed. After the direction of the in-focus potion is determined, similarly to the first and second embodiments, focusing can be quickly achieved by using the contrast evaluating value at the focusing proposed point. In this embodiment, a method for automatic focusing suitable for such situation is described.

The structure of the automatic focusing apparatus, the structure of the autofocus sensor, and the arrangement of the focus detecting areas in a third embodiment are the same as those of FIGS. 1 and 2A in the first embodiment, and hence descriptions thereof are omitted. A description is given referring to FIGS. 17 to 20 by the image taking scene of FIG. 2B as an example, similarly to the first embodiment.

Figure 17:
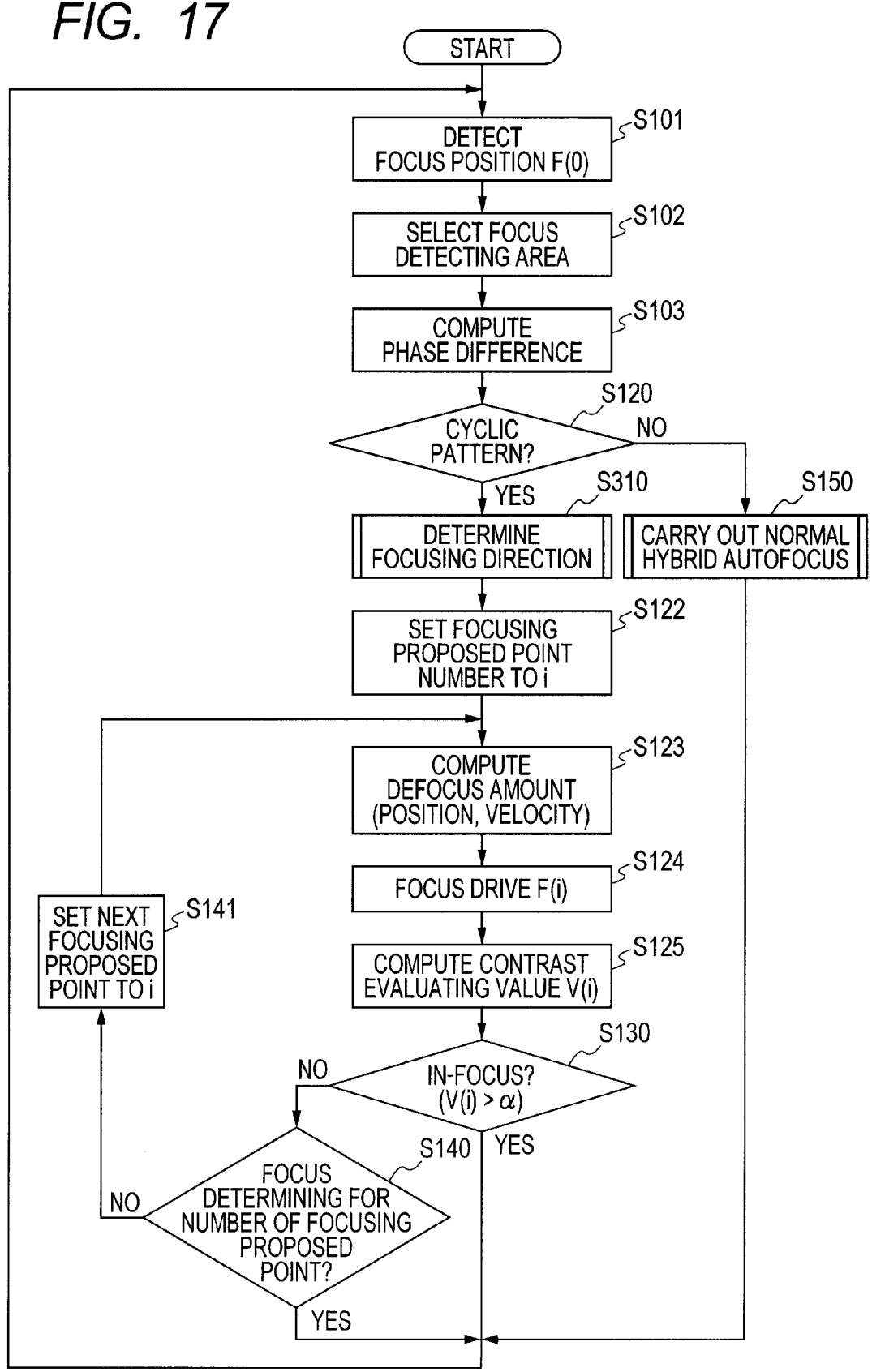
FIG. 17 is Flowchart 1 of processes in a third embodiment of the present invention.

FIG. 17 is a flowchart illustrating the flow of automatic focusing processes in the automatic focusing apparatus 100. The CPU 130 controls those processes according to a computer program stored in the memory (not shown).

The Steps S101 to S103 of FIG. 17 are the same as those in the first and second embodiments, and hence descriptions thereof are omitted. After Step S103, the process flow proceeds to Step S120 in which the cyclic pattern determination is performed. When the determination result in Step S120 is true, i.e., when it is determined that the cyclic pattern is present, the process flow proceeds to Step 310. When the determination result in Step S120 is false, i.e., when the object is a normal object, the process flow proceeds to Step S150. The same processes as those in the first embodiment are performed in Step S150, and hence a description thereof is omitted.

Figure 18:
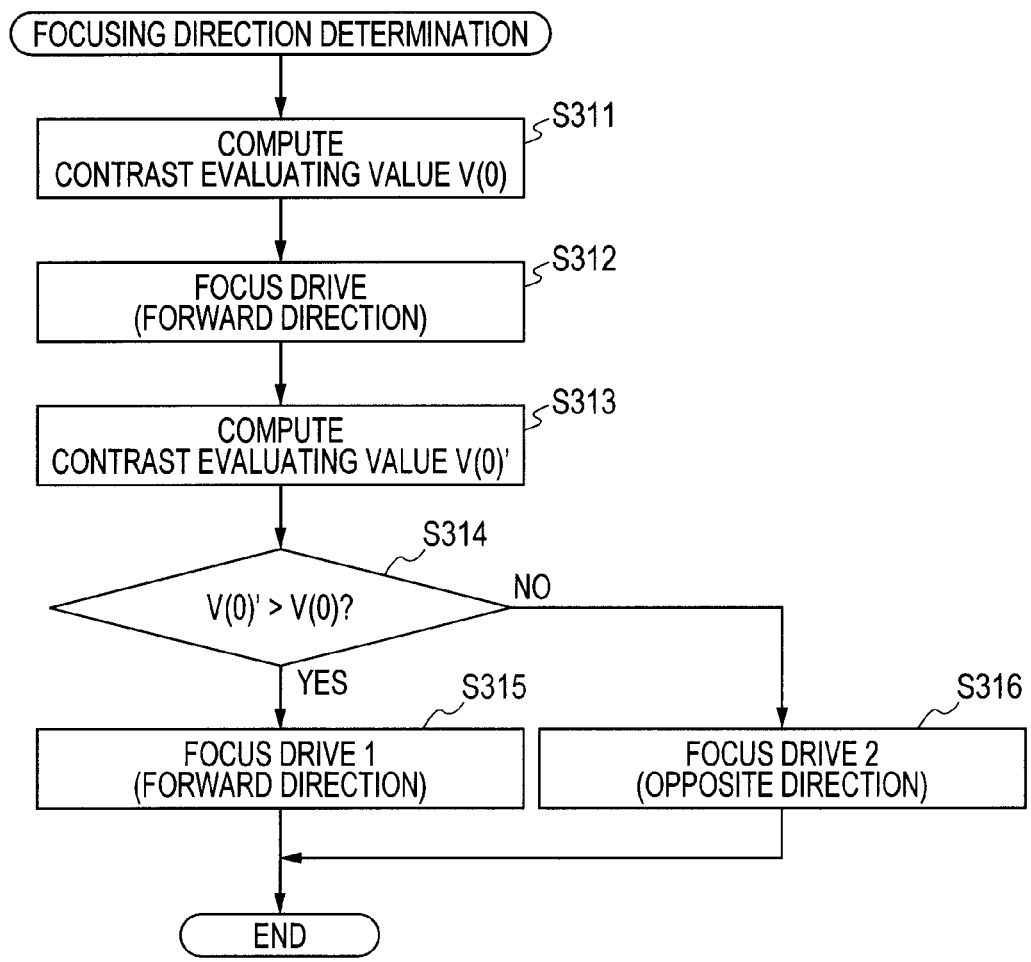
FIG. 18 is Flowchart 2 of processes in the third embodiment.

In Step S310, the focusing direction determination is performed. FIG. 18 illustrates a subroutine in Step S310. First, in Step S311, the contrast focus computing unit 132 computes a contrast evaluating value V(0). Next, the process flow proceeds to Step S312 in which the defocus amount computing unit 133 computes the defocus amount for driving the focus lens by a predetermined amount. The defocus amount is an arbitrary amount, and the defocus amount may be written into a program or the like in advance, or may be computed based on optical conditions of the automatic focusing apparatus. Then, the focus lens unit 111 is driven in a forward direction by the lens controlling unit 134. In this embodiment, as an example of the forward direction, the focus lens unit 111 is driven toward the close side. Next, the process flow proceeds to Step S313 in which the contrast focus computing unit 132 computes a contrast evaluating value V(0)'. Subsequently, the process flow proceeds to Step S314 in which the contrast evaluating values V(0) and V(0)' are compared with each other. When V(0)'>V(0) is satisfied, the process flow proceeds to Step S315, while when V(0)'≤V(0) is satisfied, the process flow proceeds to Step S316. In this embodiment, in Step S315, a focusing direction 1 corresponds to the forward direction, i.e., the close side and, in Step S316, a focusing direction 2 corresponds to an opposite direction, i.e., the infinite direction. The focusing direction is determined in this manner, and the subroutine for the focusing direction determination is ended. Subsequently, the process flow proceeds to Step S122 of the flowchart of FIG. 17.

The Steps S122, S123, S124, S125, S130, S140, and S141 are the same as those in the first embodiment, and hence descriptions thereof are omitted. Those processes described above are repeatedly executed.

Herein, the process until an in-focus condition is achieved and the process of focusing direction determination in the flowchart of FIG. 18 when the flowchart of FIG. 17 is executed are described with reference to FIGS. 19 and 20. Similarly to FIG. 11 described in the first embodiment, in FIG. 19, the horizontal axis indicates the focusing proposed point C(i) and the focusing proposed position F(i) of the focus lens unit 111. In addition, the vertical axis of FIG. 19 similarly indicates the correlated evaluating value of the focusing proposed point C(i) and the contrast evaluating value V(i) thereof. In FIG. 20, the horizontal axis indicates time, and the vertical axis indicates the position of the focus lens unit 111, similarly to FIG. 12 described in the first embodiment.

Figure 19:
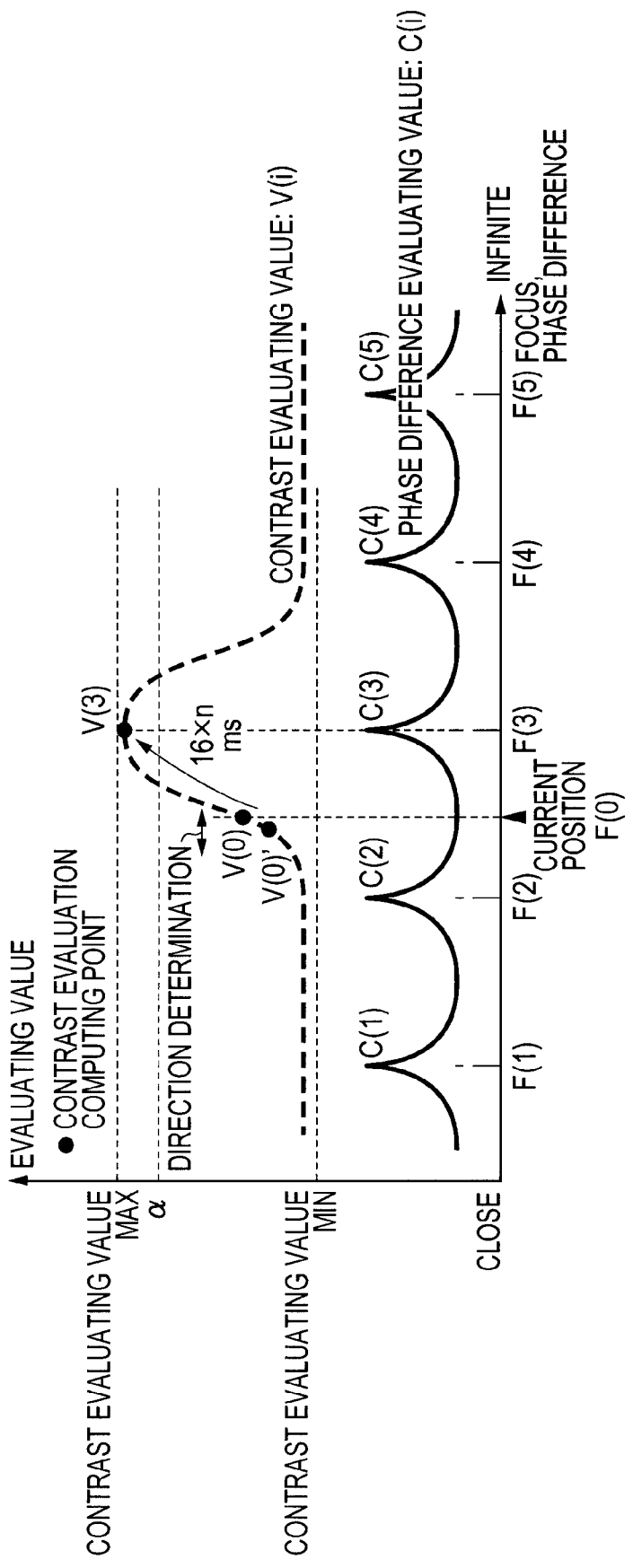
FIG. 19 is a view illustrating examples of a focusing proposed point and a contrast evaluating value in the third embodiment.
Figure 20:
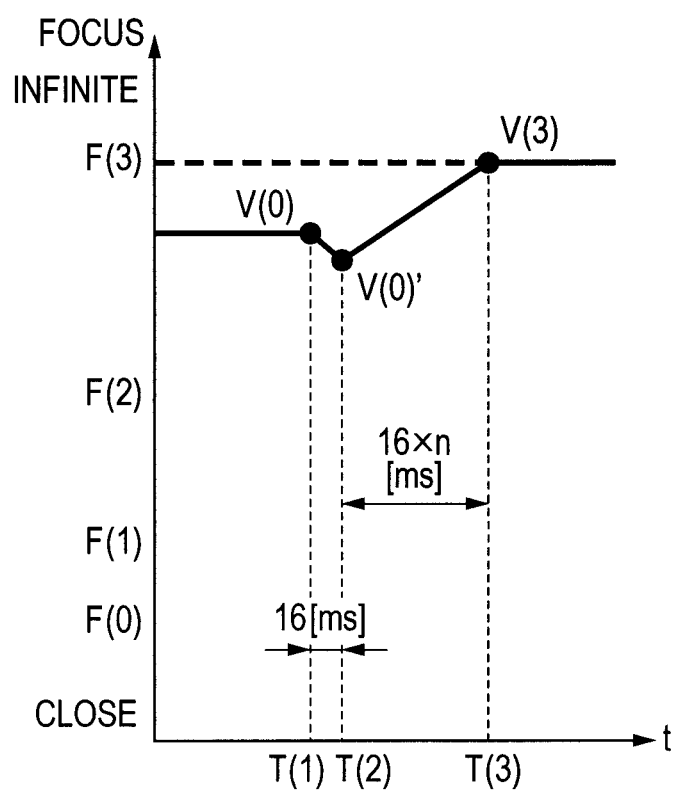
FIG. 20 is a view illustrating change in focus in the third embodiment.

Herein, it is assumed that the position F(0) of the focus lens unit 111 detected in Step S101 is located at positions illustrated in FIG. 19. In addition, the true in-focus position is assumed to be F(3). In Step S312 of FIG. 18, when it is assumed that the focus lens is driven in the forward direction, i.e., toward the close side, the contrast evaluating value V(0)' obtained in Step S313 is obtained at a position as illustrated in FIG. 19. Next, in the determination of the focusing direction in Step S314, as illustrated in FIGS. 19 and 20, V(0)>V(0)' is satisfied, and hence the process flow proceeds to Step S316 in which it is determined that the focusing direction corresponds to the opposite direction, i.e., the infinite direction. Then, the subroutine for the focusing direction determination is ended. Next, when the process flow proceeds to Step S122 in which the process is executed similarly to the first embodiment, the index of the focusing proposed point closest to F(0) is 3, and a value 3 is set in the variable i. In addition, in Steps S123 and S124, the focus lens unit 111 is driven to F(3), and a contrast evaluating value V(3) in Step S125 is obtained. Subsequently, in the focusing determination in Step S130, (the contrast evaluating value V(3))>(the threshold value α) is satisfied, and hence it is determined that focusing is achieved, and the flowchart of FIG. 17 is ended.

Thus, in this embodiment, by obtaining the contrast evaluating value in the neighborhood of the initial position F(0), the direction determination of the focusing point is performed, and by performing the focusing direction determination, the object having the cyclic pattern can be quickly focused on.

In this embodiment, although the description has been given of the case where the speed control of the focus lens unit 111 is performed in synchronization with the image update period from time T(2) to time T(3) of FIG. 20, when the focus lens unit 111 can reach the true focusing point in a time period shorter than integral multiples of the image update period, the focus lens unit 111 may be driven to the true focusing point at the maximum speed, as in the second embodiment.

In addition, in this embodiment, although it is assumed that the focus lens unit 111 is driven toward the close side as the forward direction in Step S312 in the subroutine for the focusing direction determination of FIG. 18, the focus lens unit 111 may also be driven toward the infinite side as the forward direction.

Fourth Embodiment

Each of the first to third embodiments has described the example where the focusing determination is performed by comparing the contrast evaluating value and the threshold value α. Although it is described that the threshold value α is an arbitrary value, the peak value of the contrast evaluating value at an in-focus state fluctuates depending on an image taking environment and object conditions, and hence there are cases where it is difficult to uniquely determine the threshold value α. Accordingly, when the contrast autofocus using the image signal is performed, a method in which the focusing point is searched for by performing a so-called hill climbing determination is commonly used. It is described above that the focusing precision is improved by increasing the number of search points, while it takes time to obtain an in-focus state. With this being the situation, by performing the hill climbing determination on the neighborhood of the focusing proposed point computed as a phase difference target position, a quick and high-precision focusing operation can be obtained. In this embodiment, a method for automatic focusing suitable for such situation is described.

The structure of the automatic focusing apparatus, the structure of the autofocus sensor, and the arrangement of the focus detection areas in a fourth embodiment are the same as those of FIGS. 1 and 2A in the first embodiment, and hence descriptions thereof are omitted. A description is given referring to FIGS. 21 to 25 by the image taking scene of FIG. 2B as an example, similarly to the first embodiment.

Figure 21:
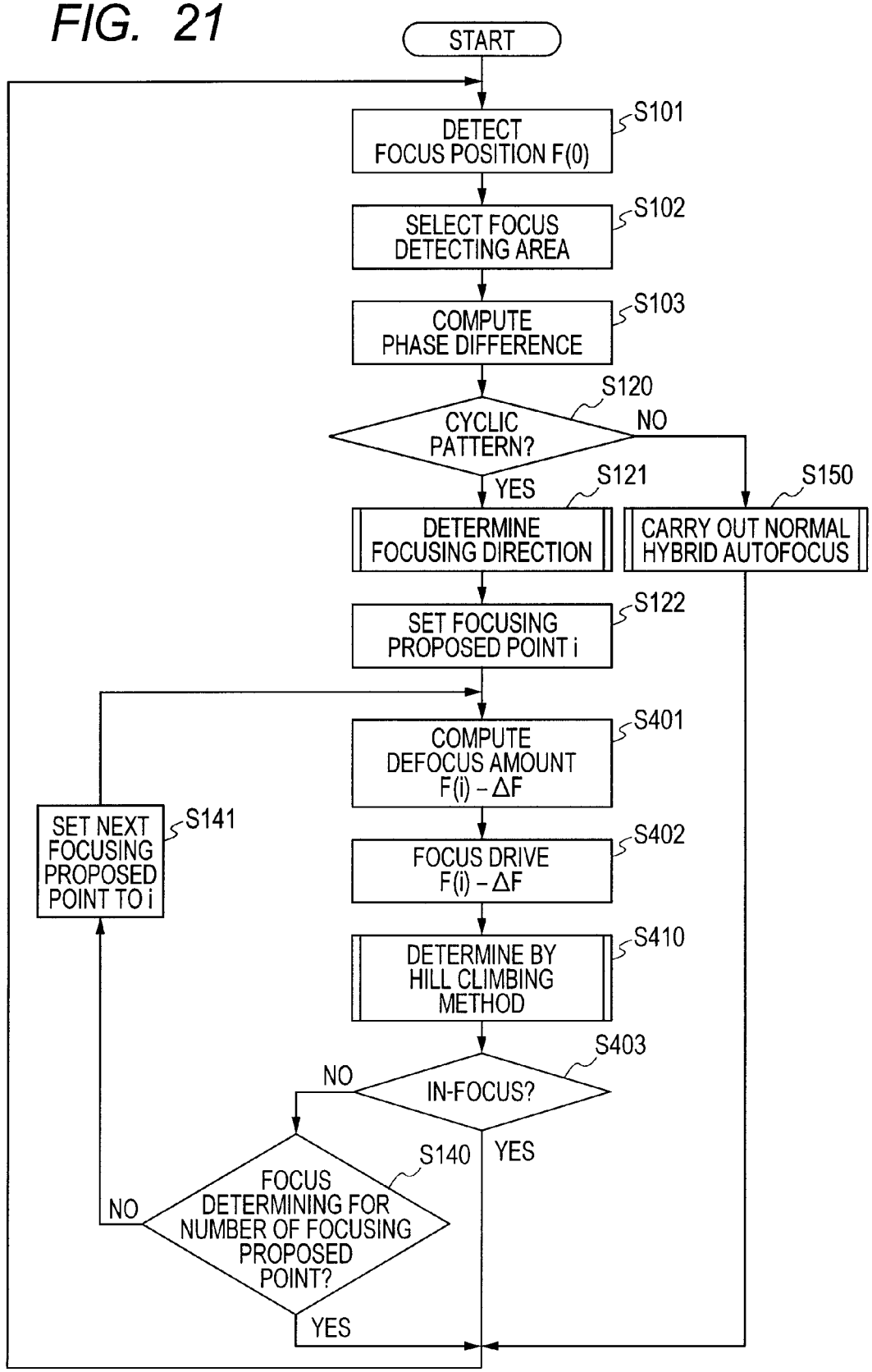
FIG. 21 is Flowchart 1 of processes in a fourth embodiment of the present invention.

FIG. 21 is a flowchart illustrating the flow of automatic focusing processes in the automatic focusing apparatus 100. The CPU 130 controls those processes according to a computer program stored in the memory (not shown).

In Steps S101 to S103, S120 to S122, and S150 of FIG. 21, the same processes as those in the first embodiment are executed, and hence descriptions thereof are omitted.

After Step S122, the process flow proceeds to Step S401. In Step S401, the computation of the defocus amount is performed. At this time, the target position is set at a position $F(i)-\Delta F$ obtained by offsetting the focusing proposed position $F(i)$ by a predetermined value. Similarly to the first embodiment, the defocus amount is determined so that time required for the focus lens unit to reach the target position matches time of an integral multiple of the image update period. Next, the process flow proceeds to Step S402 in which the focus lens unit 111 is driven to the position $F(i)-\Delta F$, similarly to Step S124 of FIG. 3 of the first embodiment. That is, after a lapse of time of an integral multiple of the image update period 16 milliseconds, the focus lens unit 111 reaches the target position. Herein, $\Delta F$ is an arbitrary value, and $\Delta F$ may be written into a program or the like in advance or may be computed based on optical conditions of the image taking apparatus, or a structure may also be adopted in which selection and switching of $\Delta F$ can be externally performed using a volume or switch (not shown).

Figure 22:
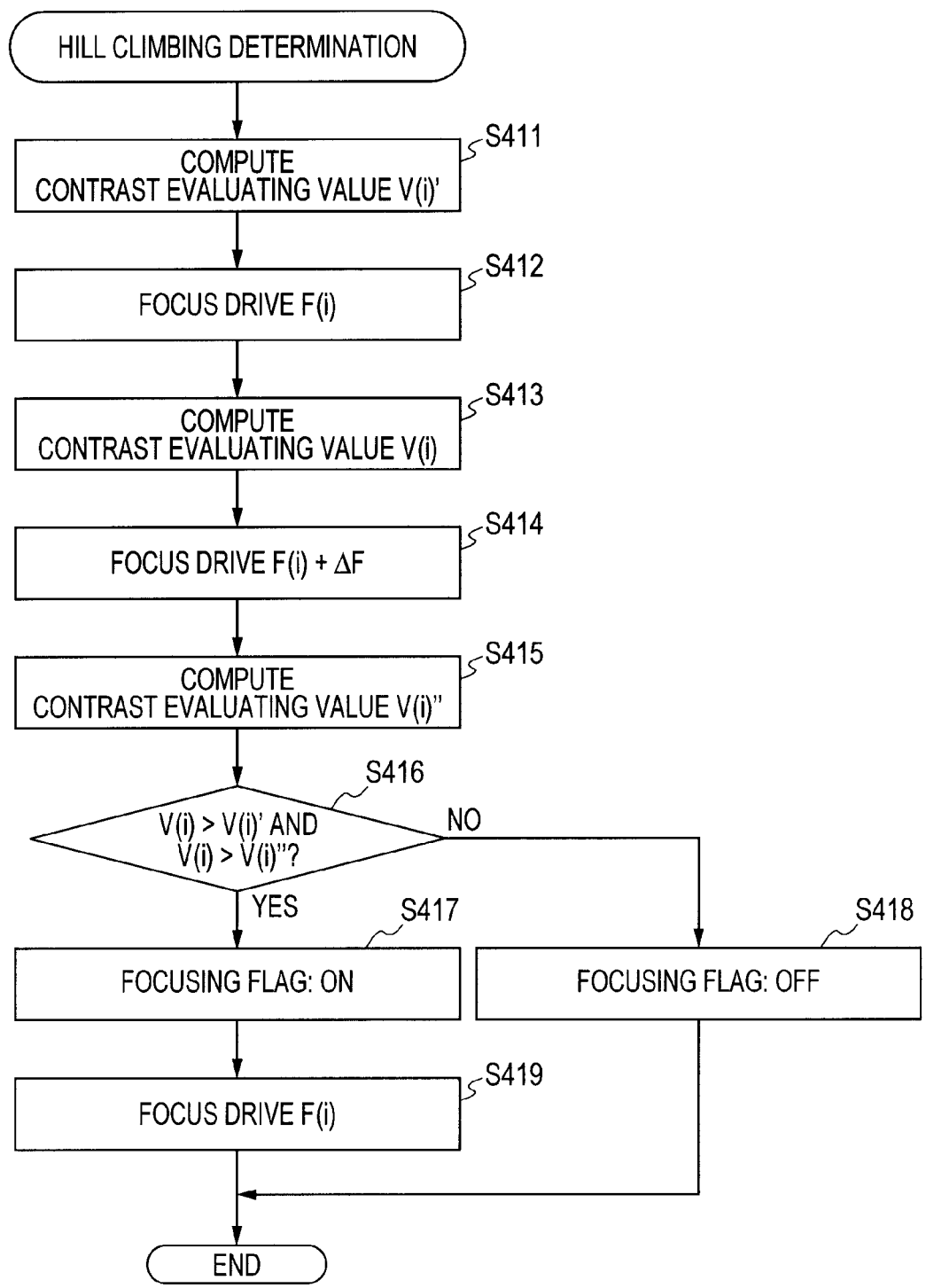
FIG. 22 is Flowchart 2 of processes in the fourth embodiment.

Next, the process flow proceeds to Step S410 in which the hill climbing determination using the contrast evaluating value is performed. FIG. 22 illustrates a subroutine in Step S410. First, in Step S411 of FIG. 22, the contrast focus computing unit 132 obtains the image from the image processing unit 141, and computes a contrast evaluating value $V(i)'$ at the position $F(i)-\Delta F$ of the focus lens unit 111. Subsequently, the process flow proceeds to Step S412 in which the lens controlling unit 134 drives the focus lens unit 111 to the position $F(i)$. Then the process flow proceeds to Step S413 in which a contrast evaluating value $V(i)$ at the position $F(i)$ of the focus lens unit 111 is computed, similarly to Step S411. Further, the process flow proceeds to Step S414 in which the focus lens unit 111 is driven to a position $F(i)+\Delta F$ obtained by offsetting the position $F(i)$ by a predetermined value. Then the process flow proceeds to Step S415 in which a contrast evaluating value $V(i)''$ at the position $F(i)+\Delta F$ of the focus lens unit 111 is computed, similarly to Steps S411 and S413.

Next, the process flow proceeds to Step S416 in which the contrast evaluating values $V(i)$, $V(i)'$, and $V(i)''$ obtained in Steps S411 to S415 are compared with each other to perform the hill climbing determination. As illustrated in Step S416, when $V(i)>V(i)'$ and $V(i)>V''$ are true, it is determined that an in-focus condition is obtained, and the process flow proceeds to Step S417 in which a focusing flag is turned ON. On the other hand, when the determination result in Step S416 is false, it is determined that an in-focus condition is not obtained, and the process flow proceeds to Step S418 in which the focusing flag is turned OFF.

Figure 23A:
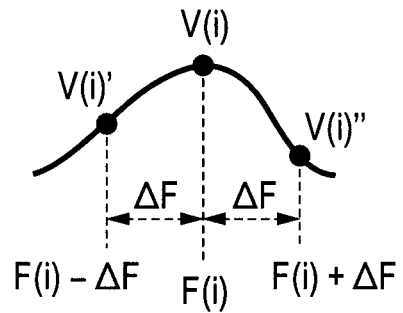
FIG. 23A is a view illustrating an example of a contrast evaluating value in the fourth embodiment.
Figure 23B:
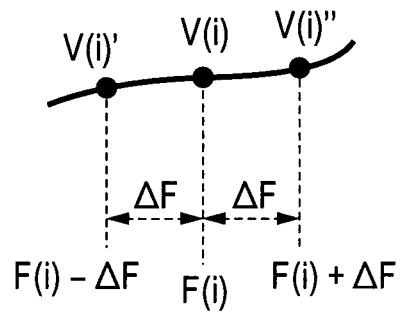
FIG. 23B is a view illustrating an example of the contrast evaluating value in the fourth embodiment.
Figure 23C:
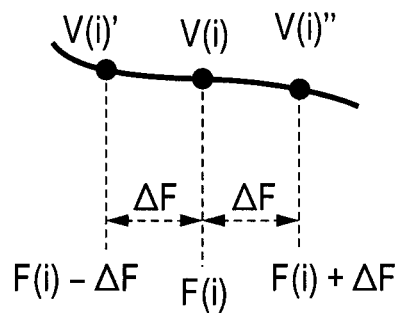
FIG. 23C is a view illustrating an example of the contrast evaluating value in the fourth embodiment.

FIGS. 23A, 23B, and 23C illustrate relations of the contrast evaluating values $V(i)$, $V(i)'$, and $V(i)''$ to the positions $F(i)$, $F(i)-\Delta F$, and $F(i)+\Delta F$ of the focus lens unit 111 when the determination in Step S416 is performed. When the relation as illustrated in FIG. 23A is given, a so-called contrast peak is attained, and the determination result is true in Step S416.

On the other hand, when the relations illustrated in FIGS. 23B and 23C are given, the contrast peak is not attained yet, and hence the determination result is false in Step S416.

The description returns to the flowchart of FIG. 22. After Step S417, the process flow proceeds to Step S419 in which the focus lens unit 111 is driven to the focusing proposed position $F(i)$, and the subroutine for the hill climbing determination is ended.

The description returns to the flowchart of FIG. 21. After Step S410, the process flow proceeds to Step S403 in which the determination of the focusing flags set in Steps S417 and S418 of FIG. 22 is performed. When the determination result is true, the processes are repeated from Step S101. On the other hand, when the determination result in Step S403 is false, the process flow proceeds to Step S140. In Steps S140 and S141, similarly to the first embodiment, another focusing proposed point is set, the processes are repeated from Step S401, and another focusing proposed point is searched for.

Herein, the process until focusing is achieved when the flowchart of FIG. 21 is executed, and the process of the so-called hill climbing determination in the flowchart of FIG. 22 are described with reference to FIGS. 24 and 25.

Figure 24:
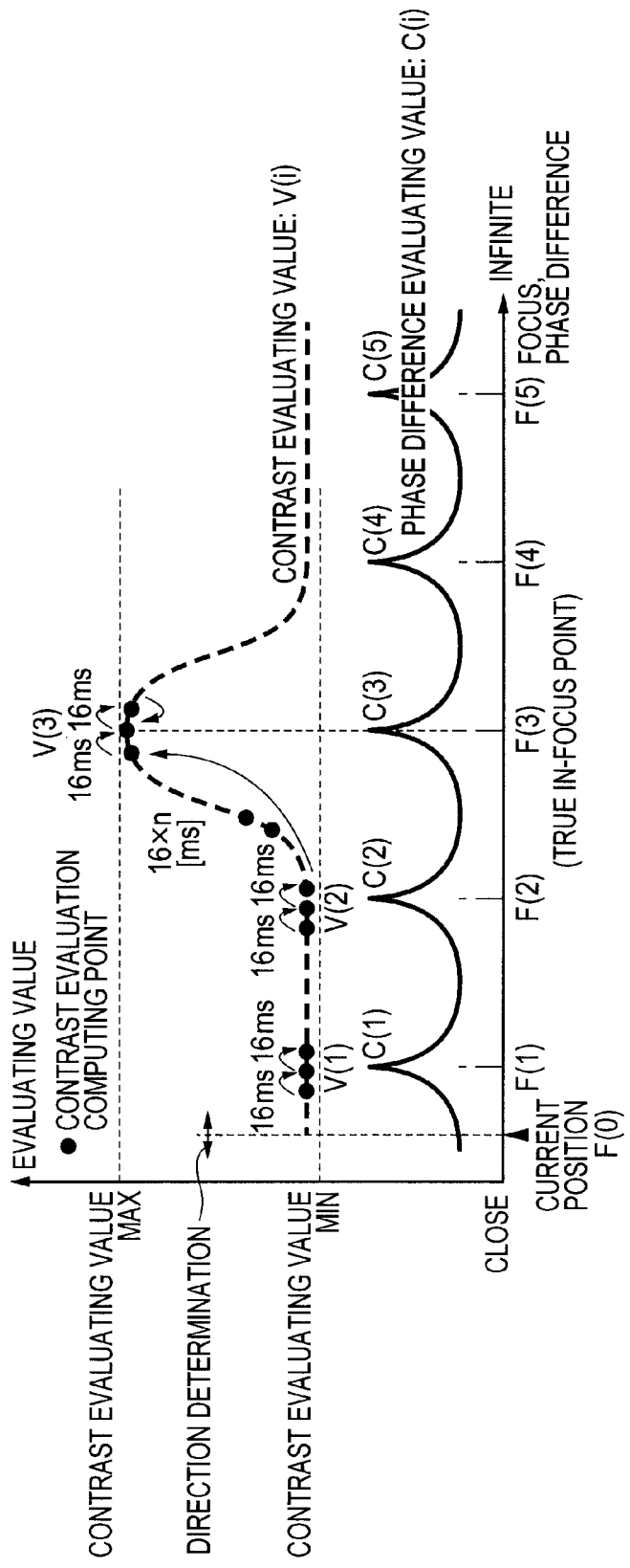
FIG. 24 is a view illustrating examples of a focusing proposed point and the contrast evaluating value in the fourth embodiment.

In FIG. 24, similarly to FIG. 11 described in the first embodiment, the horizontal axis indicates the focusing proposed point $C(i)$ and the focusing proposed position $F(i)$ of the focus lens unit 111. In addition, the vertical axis of FIG. 24 similarly indicates the correlated evaluating value of the focusing proposed point $C(i)$ and the contrast evaluating value $V(i)$ thereof. In FIG. 25, similarly to FIG. 12 described in the first embodiment, the horizontal axis indicates time, while the vertical axis indicates the position of the focus lens unit 111.

Figure 25:
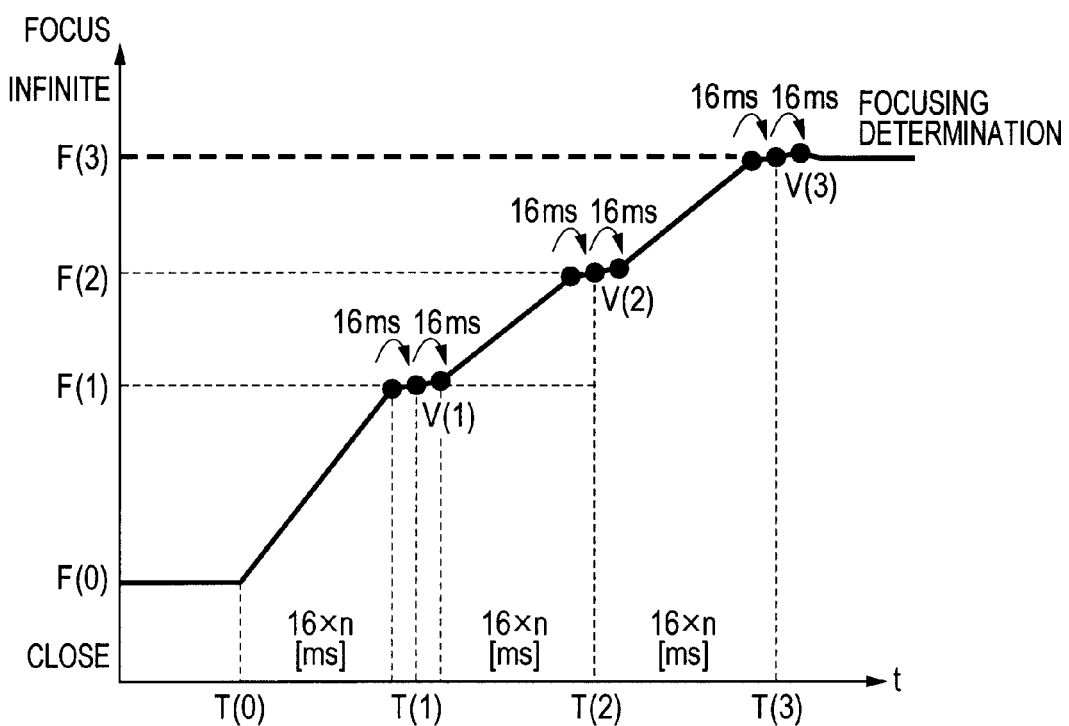
FIG. 25 is a view illustrating change in focus in the fourth embodiment.

It is assumed that, at time $T(0)$ of FIG. 25, the position $F(0)$ of the focus lens unit 111 detected in Step S101 of FIG. 21 is at positions illustrated in FIGS. 24 and 25. In addition, similarly to the first to third embodiments, the true in-focus point is assumed to be $F(3)$. In Step S121 of the flowchart of FIG. 21, similarly to the first embodiment, it is determined that the direction toward the in-focus point is the infinite direction. Next, in Step S122, a value 1 is set in the focusing proposed point number i. Then, Steps S401 and S402 are executed, and, as illustrated in FIGS. 24 and 25, a hill climbing evaluation is performed at positions of three points $F(1)-\Delta F$, $F(1)$, and $F(1)+\Delta F$, which are in the neighborhood of the position $F(1)$ of the focus lens unit 111 in Step S410. The contrast evaluating values $V(1)'$ and $V(1)''$ in the neighborhood of the contrast evaluating value $V(1)$ have the positional relation as illustrated in FIG. 23B. Therefore, the result of the focusing determination in Step S416 of the flowchart of FIG. 22 is false, and the process flow proceeds to Step S418. When i=2 is satisfied, in the situation illustrated in FIG. 25, the same contrast evaluating value as that obtained when i=1 is satisfied is obtained. Consequently, the positional relation as illustrated in FIG. 23B is given, and the result of the focusing determination in Step S416 of the flowchart of FIG. 22 is false. Similarly, when i=3 is satisfied, the contrast evaluating values have the relation as illustrated in FIG. 23A. Therefore, the result of the focusing determination in Step S416 of the flowchart of FIG. 22 is true. Then, in Step S419, the focus lens unit 111 is driven to the position F(3).

FIG. 25 illustrates the locus of the focus lens unit 111. As illustrated in FIG. 25, the driving speed of the focus lens unit 111 between the individual focusing proposed points is set so that the focus lens unit 111 is quickly driven, similarly to the first embodiment. However, the driving speed is reduced between the positions F(i)±ΔF, that is, in the neighborhood of the individual focusing proposed points, to obtain the contrast evaluating values. In addition to the reduction in driving speed, by driving the focus lens unit 111 in synchronization with the timing at which the individual contrast evaluating values are computed, the search can be effectively performed only in the neighborhood of the focusing proposed points.

Thus, in this embodiment, the driving speed of the focus lens unit 111 is increased between the focusing proposed points, and is reduced in the neighborhoods of the focusing proposed points, to thereby quickly detect the focusing point with high precision.

In this embodiment, although the example where the hill climbing determination is performed on the neighborhood of the focusing proposed point C(i) using the contrast evaluating value in the flowchart of FIG. 21 has been described, by applying Steps S152, S153, S154, and S155 of the flowchart of FIG. 10, the focusing point may be searched for in detail.

Although the exemplary embodiments of the present invention have been described thus far, it should be appreciated that the present invention is not limited to those embodiments, and various modifications and changes may be made without departing from the gist thereof.

For example, the processes described in the first to fourth embodiments may be combined and performed. Further, in order to support multiple image taking scenes, a switching unit may be provided to switch among the processes.

In the present invention, although the example where the separating unit is provided in the imaging optical system and the focus detecting unit using the separated beam is provided has been described, a structure may also be adopted in which the half mirror 121 is not provided, and the focus detecting unit 122 is provided outside the automatic focusing apparatus 100 to detect the focus by using the beam from outside light.

In addition, in the present invention, although the example where the separating unit is provided in the imaging optical system and the focus detecting unit using the separated beam is provided has been described, a structure may also be adopted in which the half mirror 121 is not provided, and the image pickup element 140 and the focus detecting unit 122 are provided as one unit.

Further, in the present invention, as illustrated in FIG. 1, although the components other than the switch 201 are provided in the automatic focusing apparatus 100, the components may be separately provided in different units. Further, although the phase difference focus computing unit 131, the contrast focus computing unit 132, the defocus amount computing unit 133, and the lens controlling unit 134 are provided in one CPU 150, the components may be separately provided in different CPUs or arithmetic units, or may be provided outside the automatic focusing apparatus 100.

Moreover, in the present invention, although the update period of the image signal is set to 16 milliseconds, it should be appreciated that the update period thereof is not limited to 16 milliseconds, and the present invention may be carried out according to various update periods of the image signal.

This application claims the benefit of Japanese Patent Application No. 2010-012093, filed Jan. 22, 2010, which is hereby incorporated by reference herein in its entirety.

The invention claimed is:

1. An automatic focusing apparatus, comprising:
   a focus driver configured to drive a focus lens unit;
   a focus position detector configured to detect a position of the focus lens unit;
   a position deriving unit configured to derive a candidate in-focus position of the focus lens unit based on phase difference information;
   an image pickup unit configured to output picked-up image information obtained by photoelectrically converting an optical image;
   a focus state determining unit configured to determine a focus state based on the picked-up image information; and
   a target position setting unit configured to set a target position towards which the focus lens unit is driven based on outputs from the position deriving unit and the focus state determining unit,
   wherein, when the position deriving unit derives a plurality of candidate in-focus positions, a focusing direction setting unit sets a focusing direction to an infinite side or a close side based on a current position of the focus lens unit, and the target position setting unit sets the target position based on a plurality of contrast evaluating values of the picked-up image information, such that:
      in a case that a current contrast evaluating value is higher than a previous contrast evaluating value, the target position setting unit sets the target position to one of the plurality of candidate in-focus positions that is adjacent to the current position of the focus lens unit and in the focusing direction, and
      in a case that the current contrast evaluating value is the same or lower than the previous contrast evaluating value, the target position setting unit sets the target position to the one of an infinity side end or a close side end which is in the focusing direction, and
   wherein the plurality of contrast evaluating values includes a contrast evaluating value obtained at a position that is not included in the plurality of candidate in-focus positions.

2. An automatic focusing apparatus according to claim 1, wherein, when a position of the focus lens unit is at the target position, the focus state determining unit determines that the in-focus state is achieved.

3. An automatic focusing apparatus according to claim 2, wherein the focus state determining unit determines whether or not the in-focus state is achieved by comparing a contrast evaluating value based on the picked-up image information output from the image pickup unit when a position of the focus lens unit is at the target position with a predetermined threshold value.

4. An automatic focusing apparatus according to claim 2, wherein the focus state determining unit determines whether or not the in-focus state is achieved by comparing a contrast evaluating value based on the picked-up image information output from the image pickup unit when a position of the focus lens unit is at the target position with a contrast evaluating value based on the picked-up image information output from the image pickup unit when a position of the focus lens unit is in a neighborhood of one of the candidate in-focus positions.

5. An automatic focusing apparatus according to claim 1, further comprising a focusing direction setting unit configured to set a driving direction of the focus lens unit,
wherein, when a position of the focus lens unit is located further on an infinite side than a middle point in a movable range of the focus lens unit, the focusing direction setting unit sets the driving direction to a direction toward a close side and, when the position of the focus lens unit is located further on the close side than the middle point in the movable range, the focusing direction setting unit sets the driving direction to a direction toward the infinite side.

6. An automatic focusing apparatus according to claim 1, further comprising a focusing direction setting unit configured to set a driving direction of the focus lens unit,
wherein, when a position of the focus lens unit is located further on an infinite side than multiple candidate in-focus positions, the focusing direction setting unit sets the driving direction to a direction toward a close side and, when the position of the focus lens unit is located further on the close side than the multiple candidate in-focus positions, the focusing direction setting unit sets the driving direction to a direction toward the infinite side.

7. An automatic focusing apparatus according to claim 1, further comprising a focusing direction setting unit configured to set a driving direction of the focus lens unit,
wherein the focusing direction setting unit sets the driving direction by use of a plurality of contrast evaluating values based on the picked-up image information output from the image pickup unit when the focus lens unit is located at different positions.

8. A lens apparatus, comprising:
a focus driving unit configured to drive a focus lens unit;
a focus position detector configured to detect a position of the focus lens unit;
a position deriving unit configured to derive a candidate in-focus position of the focus lens unit based on phase difference information;
a focus state determining unit configured to determine a focus state based on picked-up image information obtained by photoelectrically converting an optical image; and
a target position setting unit configured to set a target position towards which the focus lens unit is driven based on outputs from the position deriving unit and the focus state determining unit,
wherein, when the position deriving unit derives a plurality of candidate in-focus positions, a focusing direction setting unit sets a focusing direction to an infinite side or a close side based on a current position of the focus lens unit, and the target position setting unit sets the target position based on a plurality of contrast evaluating values of the picked-up image information, such that:
in a case that a current contrast evaluating value is higher than a previous contrast evaluating value, the target position setting unit sets the target position to one of the plurality of candidate in-focus positions that is adjacent to the current position of the focus lens unit and in the focusing direction, and
in a case that the current contrast evaluating value is the same or lower than the previous contrast evaluating value, the target position setting unit sets the target position to the one of an infinity side end or a close side end which is in the focusing direction, and
wherein the plurality of contrast evaluating values includes a contrast evaluating value obtained at a position that is not included in the plurality of candidate in-focus positions.

9. An image pickup apparatus, comprising:
a position deriving unit configured to derive a candidate in-focus position of a focus lens unit based on phase difference information;
an image pickup unit configured to output picked-up image information obtained by photoelectrically converting an optical image;
a focus state determining unit configured to determine a focus state based on the picked-up image information; and
a target position setting unit configured to set a target position towards which the focus lens unit is driven based on outputs from the position deriving unit and the focus state determining unit,
wherein, when the position deriving unit derives a plurality of candidate in-focus positions, a focusing direction setting unit sets a focusing direction to an infinite side or a close side based on a current position of the focus lens unit, and the target position setting unit sets the target position based on a plurality of contrast evaluating values of the picked-up image information, such that:
in a case that a current contrast evaluating value is higher than a previous contrast evaluating value, the target position setting unit sets the target position to one of the plurality of candidate in-focus positions that is adjacent to the current position of the focus lens unit and in the focusing direction, and
in a case that the current contrast evaluating value is the same or lower than the previous contrast evaluating value, the target position setting unit sets the target position to the one of an infinity side end or a close side end which is in the focusing direction, and
wherein the plurality of contrast evaluating values includes a contrast evaluating value obtained at a position that is not included in the plurality of candidate in-focus positions.

* * * * *